(12) United States Patent
Shimizu et al.

(10) Patent No.: US 8,886,427 B2
(45) Date of Patent: Nov. 11, 2014

(54) HYDRAULIC CONTROL APPARATUS FOR AUTOMATIC TRANSMISSION

(75) Inventors: Tetsuya Shimizu, Anjo (JP); Kenichi Tsuchida, Nishio (JP); Yoshimitsu Hyodo, Nishio (JP); Kazunori Ishikawa, Toyota (JP); Hironori Sugiura, Hekinan (JP); Satoshi Nishio, Kota (JP); Kazuki Kojima, Kariya (JP)

(73) Assignee: Aisin Aw Co., Ltd., Anjo (JP)

( * ) Notice: Subject to any disclaimer, the term of this patent is extended or adjusted under 35 U.S.C. 154(b) by 814 days.

(21) Appl. No.: 13/140,294

(22) PCT Filed: Mar. 18, 2010

(86) PCT No.: PCT/JP2010/001966
§ 371 (c)(1),
(2), (4) Date: Jun. 16, 2011

(87) PCT Pub. No.: WO2010/106808
PCT Pub. Date: Sep. 23, 2010

(65) Prior Publication Data
US 2011/0247443 A1  Oct. 13, 2011

(30) Foreign Application Priority Data

Mar. 19, 2009 (JP) ................................. 2009-068100
Dec. 22, 2009 (JP) ................................. 2009-291492

(51) Int. Cl.
*G06F 7/00* (2006.01)
*F16H 61/00* (2006.01)
*F16H 61/14* (2006.01)

(52) U.S. Cl.
CPC ............ *F16H 61/0021* (2013.01); *F16H 61/14* (2013.01); *F16H 2061/0037* (2013.01); *Y10S 477/906* (2013.01)
USPC ............. 701/67; 475/116; 477/906; 74/732.1

(58) Field of Classification Search
CPC ..... F16H 45/02; F16H 61/0021; F16H 61/14; F16H 2061/0037; B60W 10/023; B60W 10/026; B60W 2050/0008; B60W 2050/0012; B60W 2050/0014; B60W 50/029; B60W 2050/0292; B60W 2510/0233; B60W 2710/024

See application file for complete search history.

(56) References Cited

U.S. PATENT DOCUMENTS 5,090,527 A    2/1992  Imamura et al.
5,802,490 A *  9/1998  Droste ............................. 701/51

(Continued)

FOREIGN PATENT DOCUMENTS

DE  10 2005 013 137 A1   9/2006
EP     1 471 288 A2     10/2004

(Continued)

OTHER PUBLICATIONS

Partial Translation of Dec. 25, 2012 Office Action issued in Japanese Patent Application No. 2009-291492.

(Continued)

*Primary Examiner* — David D Le
(74) *Attorney, Agent, or Firm* — Oliff PLC

(57) ABSTRACT

A hydraulic control apparatus for an automatic transmission has a circulating oil supply passage that supplies circulating oil to a starting apparatus, a circulating oil discharge passage that discharges circulating oil from the starting apparatus, and a speed change mechanism oil supply passage that supplies oil to a speed change mechanism. The oil discharged from an oil pump is supplied to the starting apparatus and the speed change mechanism. A first flow rate changing device that can change the flow rate of the circulating oil is arranged in the circulating oil discharge passage. A first flow rate instructing portion output a command to the flow rate changing device to change the flow rate when the amount of oil discharged from the oil pump is low, and reduces the flow rate to the starting apparatus, which enables the hydraulic pressure necessary for shifting to be obtained in the speed change mechanism.

11 Claims, 7 Drawing Sheets

(56) References Cited

U.S. PATENT DOCUMENTS

| | | | |
|---|---|---|---|
| 5,890,509 A * | 4/1999 | Becker et al. | 137/115.26 |
| 7,951,043 B2 | 5/2011 | Reisch et al. | |
| 8,100,804 B2 * | 1/2012 | Nishimine et al. | 475/131 |
| 8,262,527 B2 * | 9/2012 | Shimizu et al. | 475/134 |
| 2004/0188180 A1 | 9/2004 | Wheeler | |

FOREIGN PATENT DOCUMENTS

| | | |
|---|---|---|
| JP | A-02-261966 | 10/1990 |
| JP | A-03-204472 | 9/1991 |
| JP | B2-2846362 | 8/1994 |
| JP | A-08-247252 | 9/1996 |
| JP | A-2005-240844 | 9/2005 |
| JP | A-2008-180303 | 8/2008 |
| JP | A-2010-65837 | 3/2010 |
| KR | 10-2005-0069750 | 7/2005 |
| WO | WO 2008072051 A2 * | 6/2008 |

OTHER PUBLICATIONS

International Search Report dated Jun. 29, 2010 in corresponding International Application No. PCT/JP2010/001966.

Written Opinion of the International Searching Authority dated Jun. 29, 2010 in corresponding International Application No. PCT/JP2010/001966.

Partial Translation of Mar. 14, 2013 Notification of Reason(s) for Refusal issued in Korean Patent Application No. 10-2011-7015147.

* cited by examiner

HYDRAULIC CONTROL APPARATUS FOR AUTOMATIC TRANSMISSION

TECHNICAL FIELD

The present invention relates to a hydraulic control apparatus for an automatic transmission mounted in a vehicle or the like, and more particularly, a hydraulic control apparatus for an automatic transmission that includes a circuit for circulating circulating oil to a starting apparatus.

BACKGROUND ART

Typically in an automatic transmission mounted in a vehicle or the like, a starting apparatus is interposed between an engine and the automatic transmission to absorb idle rotation of the engine while the vehicle is stopped, and enable power to be transmitted when starting (i.e., when taking off from a standstill). This starting apparatus mainly includes a fluid transmission apparatus (such as a torque converter, a fluid coupling, or the like). Furthermore, fluid transmission apparatuses that have a lock-up clutch that can lock up the automatic transmission with the engine so that the input speed of the automatic transmission is the same as the output speed of the engine are also continuing to become more common. This kind of fluid transmission apparatus requires a supply of circulating oil as a medium for transmitting power and for cooling. Also, engagement pressure needs to be supplied to the lock-up clutch during lock-up. Line pressure is used as the base pressure of the engagement pressure and the pressure of this circulating oil (see Japanese Patent Application Publication No. 2005-240844 (JP-A-2005-240844)).

Incidentally, multi-stage automatic transmissions in particular execute shifts by engaging and releasing clutches and brakes by supplying and discharging hydraulic pressure to and from hydraulic servos of those clutches and brakes in an automatic speed change mechanism, and use line pressure also as the base pressure of the hydraulic pressure used for these shifts. Therefore, if line pressure ends up being supplied to the fluid transmission apparatus when the engine speed is low and the amount of fluid discharged from an oil pump is low, for example, it may take time to obtain the hydraulic pressure required for the shift in the automatic speed change mechanism, and as a result, the shift duration may end up becoming long.

Also, one conceivable way to quickly obtain the hydraulic pressure required for a shift in the automatic speed change mechanism while supplying the required amount of fluid to the fluid transmission apparatus is to increase the size of the oil pump or increase the engine speed. However, in this case, there is the problem that the fuel efficiency of the vehicle ends up being affected by the amount that the size of the oil pump is increased or the amount that the engine speed is increased.

SUMMARY OF INVENTION

The present invention thus provides a hydraulic control apparatus for an automatic transmission that changes the flow rate of circulating oil of a starting apparatus according to the amount of oil discharged from an oil pump, and preferentially supplies oil to an automatic speed change mechanism when the amount of oil discharged from the oil pump is small.

A first aspect of the present invention relates to a hydraulic control apparatus for an automatic transmission that supplies oil discharged from an oil pump that operates in conjunction with a drive source to both a starting apparatus that is connected to the drive source and an automatic speed change mechanism that is connected to the starting apparatus. This hydraulic control apparatus includes a circulating oil supply passage that supplies oil that has been discharged from the oil pump into a common oil passage to the starting apparatus as circulating oil; a circulating oil discharge passage that discharges the circulating oil from the starting apparatus; a speed change mechanism oil supply passage that supplies oil in the common oil passage to the automatic speed change mechanism; a first flow rate changing device that is arranged in at least one of the circulating oil supply passage or the circulating oil discharge passage and is able to change the flow rate of the circulating oil; and a first flow rate instructing portion that outputs a command to the first flow rate changing device to change the flow rate of the circulating oil according to the amount of oil discharged from the oil pump.

Incidentally, in the present invention, having the first flow rate instructing portion that outputs a command to the first flow rate changing device to change the flow rate of the circulating oil according to the amount of oil discharged from the oil pump is a concept that includes a case in which the first flow rate instructing portion outputs a command to the first flow rate changing device to change the flow rate based on the actual amount of oil discharged from the oil pump that has been calculated from the engine speed or the like, and a case in which the first flow rate instructing portion estimates the amount of oil discharged from the oil pump based on the state of the vehicle, such as the engine speed or the vehicle speed, and outputs a command to change the flow rate.

According to the first aspect described above, when the amount of oil discharged from the oil pump is small, the flow rate to the starting apparatus can be made small and oil can be preferentially supplied to the speed change mechanism. Accordingly, the hydraulic pressure necessary for shifting can be obtained in the speed change mechanism when the amount of oil discharged from the oil pump is small, which makes it possible to prevent the shift duration from becoming long.

Also, the shift duration can be prevented from becoming long without increasing the size of the oil pump or increasing the engine speed. Accordingly, the shift duration can be prevented from becoming long without affecting the fuel efficiency of the vehicle.

In the first aspect described above, the starting apparatus may have a drive shaft that is connected to the drive source, an input shaft that is connected to the automatic speed change mechanism, and a clutch that is able to connect the drive shaft to the input shaft. The engagement state of the clutch may be controlled by a difference between the engagement pressure supplied to a hydraulic servo of the clutch and the pressure of the circulating oil, and the first flow rate changing device may change the flow rate of the circulating oil in a stepped manner.

According to this structure, control of the clutch is easier than it is when the flow rate of the circulating oil is changed in a continuous manner.

Also, the hydraulic control apparatus having the structure described above may also include a line pressure regulating portion that regulates the pressure of the oil discharged from the oil pump as line pressure. The circulating oil of the starting apparatus may be supplied based on the line pressure regulated by the line pressure regulating portion, and the first flow rate instructing portion may output the command to the first flow rate changing device to change the flow rate such that the flow rate of the circulating oil decreases when the amount of oil discharged from the oil pump is small.

According to this structure, oil that is based on the line pressure can be preferentially supplied to the speed change mechanism, such that the hydraulic pressure necessary for shifting can be obtained in the speed change mechanism even when the amount of oil discharged from the oil pump is small. As a result, the shift duration can be prevented from becoming long.

In the structure described above, the first flow rate changing device may be arranged in the circulating oil discharge passage.

If for example the first flow rate changing device is arranged in the circulating oil supply passage oil passage and the flow rate is reduced, the starting apparatus may not be able to be filled up with circulating oil. However, according to this structure, the flow rate of the circulating oil that is discharged from the starting apparatus is controlled, so the starting apparatus can be reliably filled up with lubricating oil regardless of whether the flow rate is large or small.

The hydraulic control apparatus having the structure described above may also include a circulating oil stabilizing device that is arranged in the circulating oil supply passage and stabilizes the circulation pressure of the circulating oil supplied to the starting apparatus. The first flow rate changing device may be arranged in the circulating oil discharge passage.

According to this structure, the flow rate of the circulating oil can be changed while stabilizing the pressure within the starting apparatus, which makes control of the clutch even easier. Also, the flow rate of the circulating oil that is discharged from the starting apparatus is controlled, so the starting apparatus can be reliably filled up with lubricating oil regardless of whether the flow rate is large or small.

The hydraulic control apparatus having the structure described above may also include a line pressure regulating portion that regulates the pressure of the oil discharged from the oil pump as line pressure. The line pressure regulating portion may include a regulator valve that regulates the pressure of the oil discharged from the oil pump, and a first pressure regulating solenoid valve that outputs control pressure that controls the regulator valve. The first flow rate changing device may include a small flow rate oil passage having therein a flow rate restricting member that restricts the flow rate of the circulating oil, a large flow rate oil passage that enables a larger flow rate than the flow rate of the small flow rate oil passage, and a first flow rate changing valve that receives the line pressure and switches between a small flow rate position that communicates the circulating oil discharge passage with the small flow rate oil passage, and a large flow rate position that communicates the circulating oil discharge passage with the large flow rate oil passage, based on the line pressure. The first flow rate instructing portion may output a command to the first pressure regulating solenoid valve to change the line pressure according to the amount of oil discharged from the oil pump.

According to this structure, a new solenoid valve does not need to be provided to switch the first flow rate changing valve, so the hydraulic control apparatus can be prevented from becoming larger.

Incidentally, in recent years, the engine speed region within which the clutch is able to be engaged while in a slip state has been expanded in order to improve fuel efficiency, so there is a tendency to reduce the set value of the engagement pressure that starts to engage the clutch. Therefore, when switching the first flow rate changing valve with the engagement pressure of the clutch, it is necessary to change the setting of the spring so that the first flow rate changing valve will switch with lower pressure than the set value. However, if the urging force of the spring is set weak so that the valve will switch with low pressure, it will take time for the position of the spool to be pushed back by the spring. Also, in order to switch the position of the valve with low pressure, the engagement pressure must be precisely controlled by that amount, such that the control of the second pressure regulating solenoid valve, for example, becomes complex.

However, using the line pressure to switch the first flow rate changing valve enables the first flow rate changing valve to be controlled more quickly and easily while increasing the range of the engine speed within which the clutch can be engaged in a slip state than when the engagement pressure is used to switch the first flow rate changing valve.

The hydraulic control apparatus having the structure described above may also include a second pressure regulating solenoid valve that regulates engagement pressure supplied to a hydraulic servo of the clutch. The first flow rate changing device may include a small flow rate oil passage having therein a flow rate restricting member that restricts the flow rate of the circulating oil, a large flow rate oil passage that enables a larger flow rate than the flow rate of the small flow rate oil passage, and a first flow rate changing valve that receives engagement pressure of the second pressure regulating solenoid valve and switches between a small flow rate position that communicates the circulating oil discharge passage with the small flow rate oil passage, and a large flow rate position that communicates the circulating oil discharge passage with the large flow rate oil passage, based on the engagement pressure. The first flow rate instructing portion may output a command to the second pressure regulating solenoid valve to change the engagement pressure according to the amount of oil discharged from the oil pump.

According to this structure, a new solenoid valve does not need to be provided to switch the first flow rate changing valve, so the hydraulic control apparatus can be prevented from becoming larger.

Moreover, in the structure described above, the first flow rate changing valve may switch from the small flow rate position to the large flow rate position when the engagement pressure becomes equal to a set pressure that is lower than an engagement starting pressure that engages the clutch.

According to this structure, the first flow rate changing valve can be switched by the engagement pressure of the clutch, and this switching of the first flow rate changing valve can be controlled independently of the engagement/disengagement of the clutch.

BRIEF DESCRIPTION OF DRAWINGS

The features, advantages, and technical and industrial significance of this invention will be described in the following detailed description of example embodiments of the invention with reference to the accompanying drawings, in which like numerals denote like elements, and wherein.

DESCRIPTION OF EMBODIMENTS

Hereinafter, a first example embodiment of the present invention will be described with reference to FIGS. 1 to 4.

Figure 1:
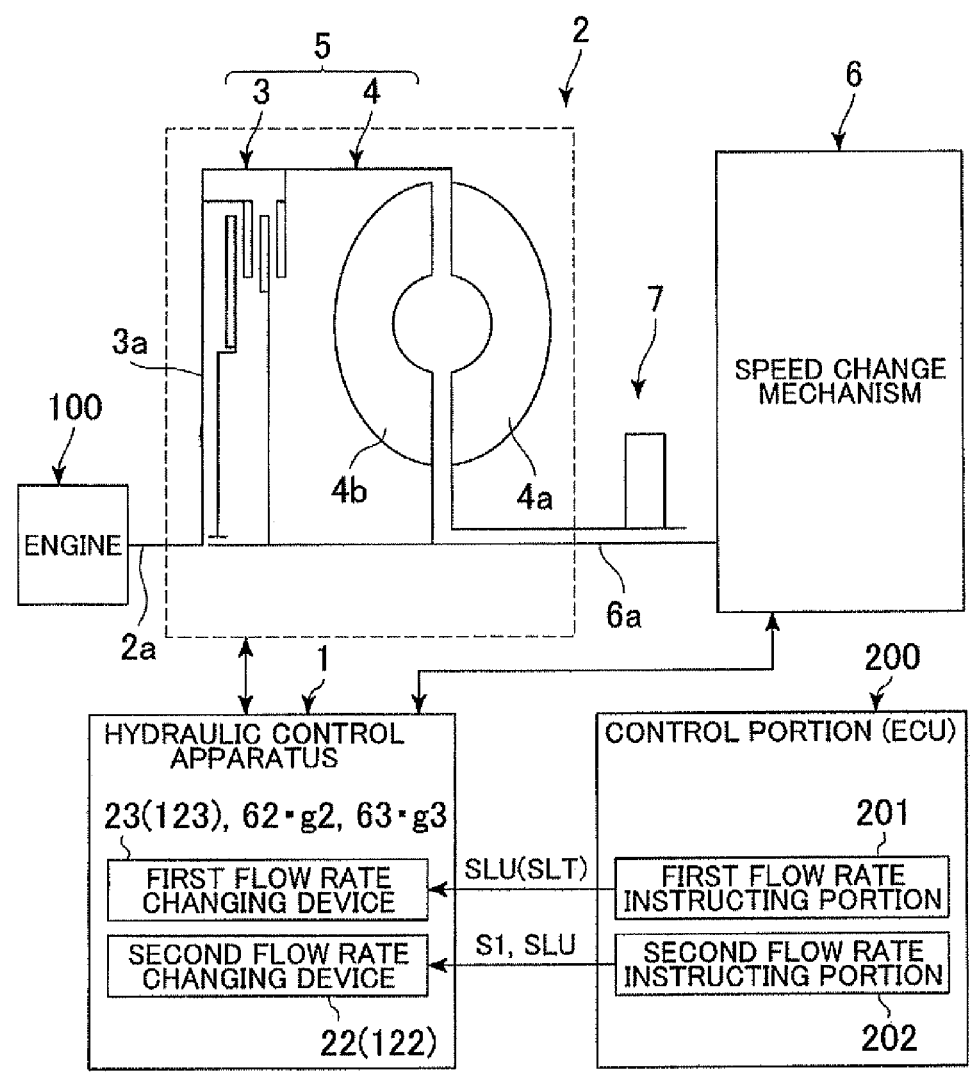
FIG. 1 is a view showing a frame format of a power transmitting system, and a control system thereof, in a vehicle according to example embodiments of the present invention.

First, an automatic transmission 2 to which the present invention can be applied has an input shaft (i.e., a drive shaft) 2a that is connected to a crankshaft of an engine (i.e., a drive source) 100, a starting apparatus 5 that is centered around the axial direction of the input shaft 2a, and a speed change mechanism (i.e., an automatic speed change mechanism) 6, as shown in FIG. 1. The starting apparatus 5 has a starting clutch (i.e., clutch) 3 and a fluid coupling 4. The starting clutch 3 is structured so as to be able to detachably connect the input shaft 2a of the automatic transmission 2 to an input shaft 6a of the speed change mechanism 6 based on engagement pressure PSLU, which will be described in detail later, being supplied to a hydraulic servo 3a. The fluid coupling 4 has a pump impeller 4a that is connected to the input shaft 2a, and a turbine runner 4b to which the rotation of the pump impeller 4a is transmitted via circulating oil. The turbine runner 4b is connected to the input shaft 6a of the speed change mechanism 6. That is, the starting apparatus 5 is connected to the speed change mechanism 6. Incidentally, an oil pump 7 is connected to the pump impeller 4a. That is, the oil pump 7 is driven in conjunction with the engine 100.

Also, the starting apparatus 5 connected to a hydraulic control apparatus 1, which will be described in detail later. This hydraulic control apparatus 1 is connected to, and electronically controlled by, a control portion (ECU) 200. The hydraulic control apparatus 1 includes a first flow rate changing device (which is formed by a second circulation relay valve 23, an oil passage g2 having an orifice 62 therein, and an oil passage g3 having an orifice 63 therein, which will be described in detail later), and a second flow rate changing device (which is formed by a first circulation relay valve 22, which will be described in detail later). Also, the control portion 200 includes a first flow rate instructing portion 201 that outputs a command to the first flow rate changing device using a linear solenoid valve SLU, which will be described later, and a second flow rate instructing portion 202 that outputs a command to the second flow rate changing device using a solenoid valve S1, which will be described later.

With the starting apparatus 5 structured as described above, the starting clutch 3 is released when the vehicle is stopped, and idle rotation of the engine 100 is permitted even in a forward range (D-range) by the fluid coupling 4, for example. Also, when starting off, i.e., during take-off, for example, power is transmitted by the fluid transmission of the fluid coupling 4. As will be described in detail later, at or above a predetermined speed Va, the control portion 200 makes a determination to engage the starting clutch 3, so the engagement pressure PSLU is increased and the starting clutch 3 is engaged (see FIG. 4). That is, the fluid coupling 4 becomes locked up such that the input shaft 2a of the automatic transmission 2 (i.e., the crankshaft of the engine) is directly connected or locked up with the input shaft 6a of the speed change mechanism 6.

Incidentally, the speed change mechanism 6 is formed by a multi-stage speed change mechanism, for example, and is able to establish six forward speeds and a reverse speed according to the engagement states of shift clutches C-1, C-2, and C-3, and shift brakes B-1 and B-2 (i.e., friction engagement elements for shifting). More specifically, the first forward speed can be established by engaging the clutch C-1 and the brake B-2 (or a one-way clutch F-1). The second forward speed can be established by engaging the clutch C-1 and the brake B-1. The third forward speed can be established by engaging the clutch C-1 and the clutch C-3. The fourth forward speed can be established by engaging the clutch C-1 and the clutch C-2. The fifth forward speed can be established by engaging the clutch C-2 and the clutch C-3. The sixth forward speed can be established by engaging the clutch C-2 and the brake B-1. The reverse speed can be established by engaging the clutch C-3 and the brake B-2.

Continuing on, a hydraulic control apparatus 1a for an automatic transmission according to the first example embodiment will be described with reference to FIGS. 2 and 3. Incidentally, the hydraulic circuit of the hydraulic control apparatus 1a is shown divided between FIG. 2 and FIG. 3 but is continuous at reference characters A to E in the drawings. Also, in this example embodiment, in order to describe the spool position, the position in which the spool is on the right side in FIGS. 2 and 3 will be referred to as the "right-hand position," and the position in which the spool is on the left side in FIGS. 2 and 3 will be referred to as the "left-hand position."

Figure 2:
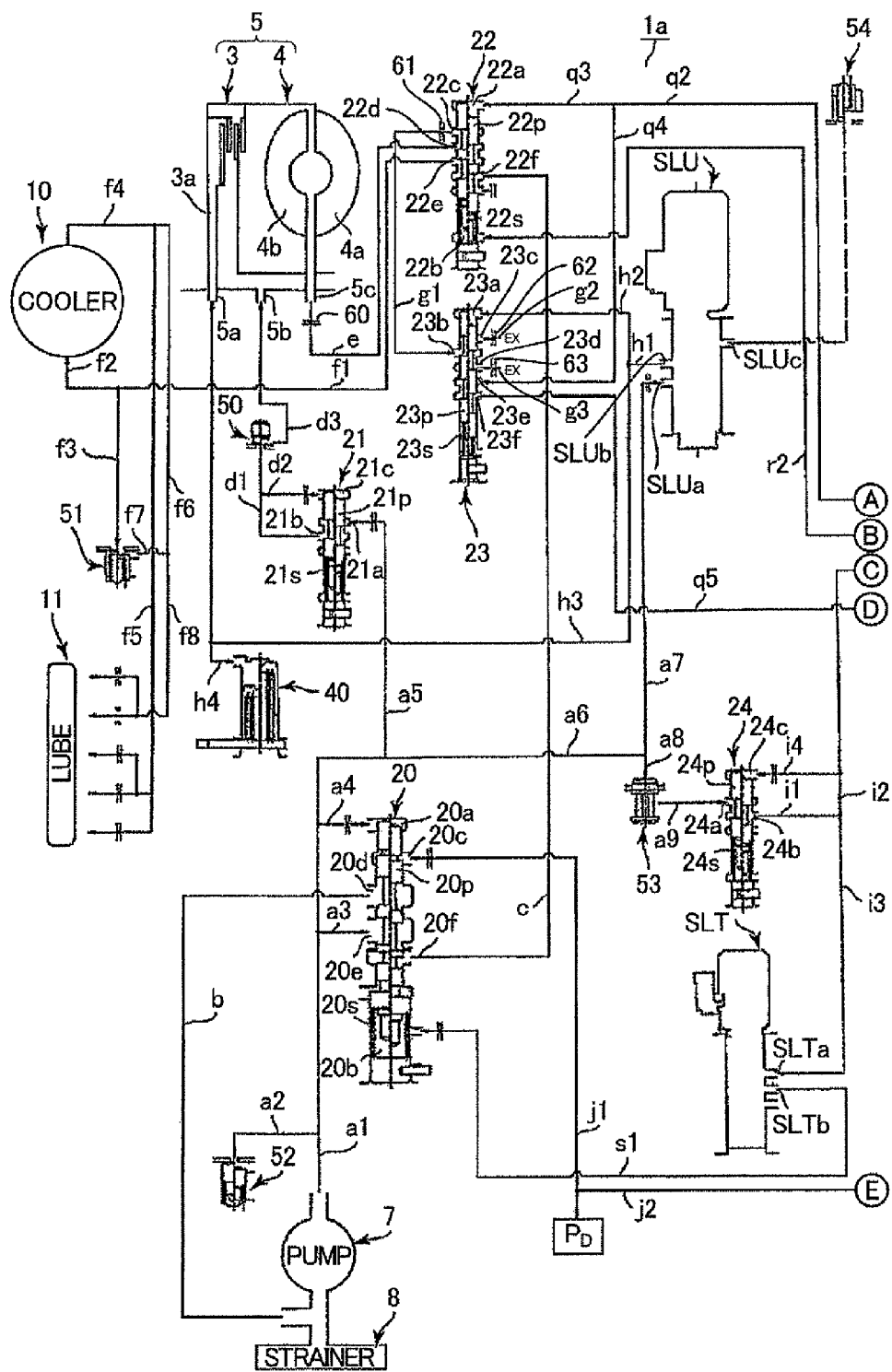
FIG. 2 is a circuit diagram of the main portion of the present invention of a hydraulic control apparatus for an automatic transmission according to a first example embodiment of the present invention.

As shown in FIG. 2, the hydraulic control apparatus 1a includes an oil pump 7 that draws up oil via a strainer 8 arranged in an oil pan, not shown. The hydraulic pressure generated by the oil pump 7 being driven in conjunction with the engine 100 is discharged into oil passages (common oil passages) a1 to a9. This generated hydraulic pressure is regulated to a line pressure PL by a primary regulator valve (i.e., a line pressure regulating portion) 20, which will be described in detail later. Of these oil passages, the oil passage a2 is connected to a check valve 52. If the pressure generated by the oil pump 7 (i.e., the line pressure PL) that is output to the oil passages a1 to a9 becomes equal to or greater than a predetermined pressure, the check valve 52 opens to prevent excessive pressure from being applied to various parts.

Meanwhile, a linear solenoid valve (i.e., a line pressure regulating portion) SLT has an input port SLTa that inputs modulator pressure PMOD from a solenoid modulator valve 24, which will be described in detail later, via oil passages i1 and i3, and an output port SLTb that regulates the modulator pressure PMOD according to the throttle opening amount (i.e., the amount of acceleration required by the driver) and outputs the regulated modulator pressure PMOD as SLT pressure PSLT. The output port SLTb is connected to an oil chamber 20b of the primary regulator valve 20 via an oil passage s1. That is, the SLT pressure PSLT is output from the output port SLTb in proportion to the throttle opening amount, and the primary regulator valve 20 is controlled by that output SLT pressure PSLT.

The primary regulator valve 20 includes a spool 20p and a spring 20s that urges the spool 20p upward in the drawing, as well as an oil chamber 20a above the spool 20p in the drawing, an oil chamber 20b below the spool 20p in the drawing, and an oil chamber 20c below the oil chamber 20a in the drawing. The primary regulator valve 20 is also formed having a pressure regulating port 20e, a discharge port 20d, and a back-pressure output port 20f. The SLT pressure PSLT is input from the linear solenoid valve SLT described above to the oil chamber 20b via the oil passage s1. Also, the line pressure PL is input as feedback pressure to the oil chamber 20a via the oil passage a4. Further, forward range pressure PD is input from a manual valve, not shown, to the oil chamber 20c via an oil passage j1.

The urging force of the spring 20s and the SLT pressure PSLT act against the feedback pressure on the spool 20p of the primary regulator valve 20. That is, the position of the spool 20p is controlled mainly by the amount of SLT pressure PSLT. When the spool 20p is on the lower side in the drawing, the pressure regulating port 20e is communicated with the discharge port 20d. Also, when the spool 20p is controlled to move to the upper side in the drawing, the amount of communication between the pressure regulating port 20e and the discharge port 20d is reduced (i.e., communication is increasingly cut off). That is, the spool 20p is controlled to move up and down according to the amount of SLT pressure PSLT that is input to the oil chamber 20b, and the hydraulic pressure of the pressure regulating port 20e that receives the oil discharged from the oil pump 7 is regulated by regulating the amount of hydraulic pressure discharged from the discharge port 20d. As a result, the hydraulic pressure in the oil passages a1 to a9 is regulated as line pressure PL according to the throttle opening amount.

The hydraulic pressure discharged from the discharge port 20d is returned to the intake side of the oil pump 7 and thus becomes the base pressure of the oil pump 7, which consequently reduces the necessary driving force of the oil pump 7, thereby preventing energy from being consumed needlessly which makes it possible to contribute to better fuel efficiency of the vehicle provided with the hydraulic control apparatus 1a.

Also, except for when the flow rate of circulating oil, which will be described in detail later, is greatest, back-pressure PL-LUBE of the line pressure PL output from the back-pressure output port 20f is supplied to an oil cooler 10 and a lubricating oil passage (LUBE) 11 via an oil passage c, the first circulation relay valve 22, which will be described later, and oil passages f1 to f8. Incidentally, when forward range pressure PD is supplied to the oil chamber 20c, the spool 20p is pushed downward in the drawing, such that the back-pressure PL-LUBE of the line pressure PL output from the back-pressure output port 20f increases. That is, when running in the forward range, the cooling effect from the oil cooler 10 is increased, and the amount of lubricating oil supplied from the lubricating oil passage 11 to the speed change mechanism 6 is increased.

The line pressure PL is supplied to a modulator valve 21, which will be described later, via the oil passage a5, to the linear solenoid valve SLU, which will also be described later, via the oil passages a6 and a7, and to the solenoid modulator valve 24 via the oil passages a6 and a8, a check valve 53, and the oil passage a9.

Of these, the solenoid modulator valve 24 has a spool 24p and a spring 24s that urges the spool 24p upward in the drawing, as well as an input port 24a, an output port 24b, and an oil chamber 24c. If the line pressure PL is less than a predetermined pressure, the solenoid modulator valve 24 outputs the line pressure PL that is input to the input port 24a as it is from the output port 24b as the modulator pressure PMOD. If the line pressure PL is equal to or greater than the predetermined pressure, the urging force of the spring 24s is overcome by the feedback pressure input to the oil chamber 24c via the oil passages i1, i2, and i4, such that the spool 24p moves downward in the drawing. As a result, the line pressure PL input to the input port 24a is regulated to a substantially constant pressure and output as modulator pressure PMOD. This modulator pressure PMOD is supplied to the linear solenoid valve SLT via an oil passage i3, as well as supplied as base pressure to input ports S1a and S2a of solenoid valves S1 and S2, which will be described in detail later, via oil passages i2 (which continues on to C in FIG. 3), i5, and i6.

Meanwhile, a manual shift valve, not shown, has a spool that is mechanically (or electrically) driven by a shift lever provided near a driver's seat, not shown. This manual shift valve is placed in an output state in which it outputs the input line pressure PL, or a non-output (drain) state in which it does not output (i.e., in which it drains) the input line pressure PL, in response to the position of the spool being changed according to the shift range (such as P, R, N, or D) selected with the shift lever.

More specifically, when the D-range is selected based on an operation of the shift lever, the position of the spool is such that the input port into which the line pressure PL is input is communicated with a forward range pressure output port, such that the line pressure PL is output as forward range pressure PD from this forward range pressure output port. When the R (Reverse)-range is selected based on an operation of the shift lever, the position of the spool is such that the input port is communicated with a reverse range pressure output port, such that the line pressure PL is output as reverse range pressure PR from this reverse range pressure output port. Also, when the P-range or the N-range is selected based on an operation of the shift lever, the spool closes off the input port from the forward range pressure output port and the reverse range pressure output port, and communicates the forward range pressure output port and the reverse range pressure output port with the drain port. That is, the manual shift valve is placed in a non-output state in which the D-range pressure PD and the R-range pressure PR are drained.

Figure 3:
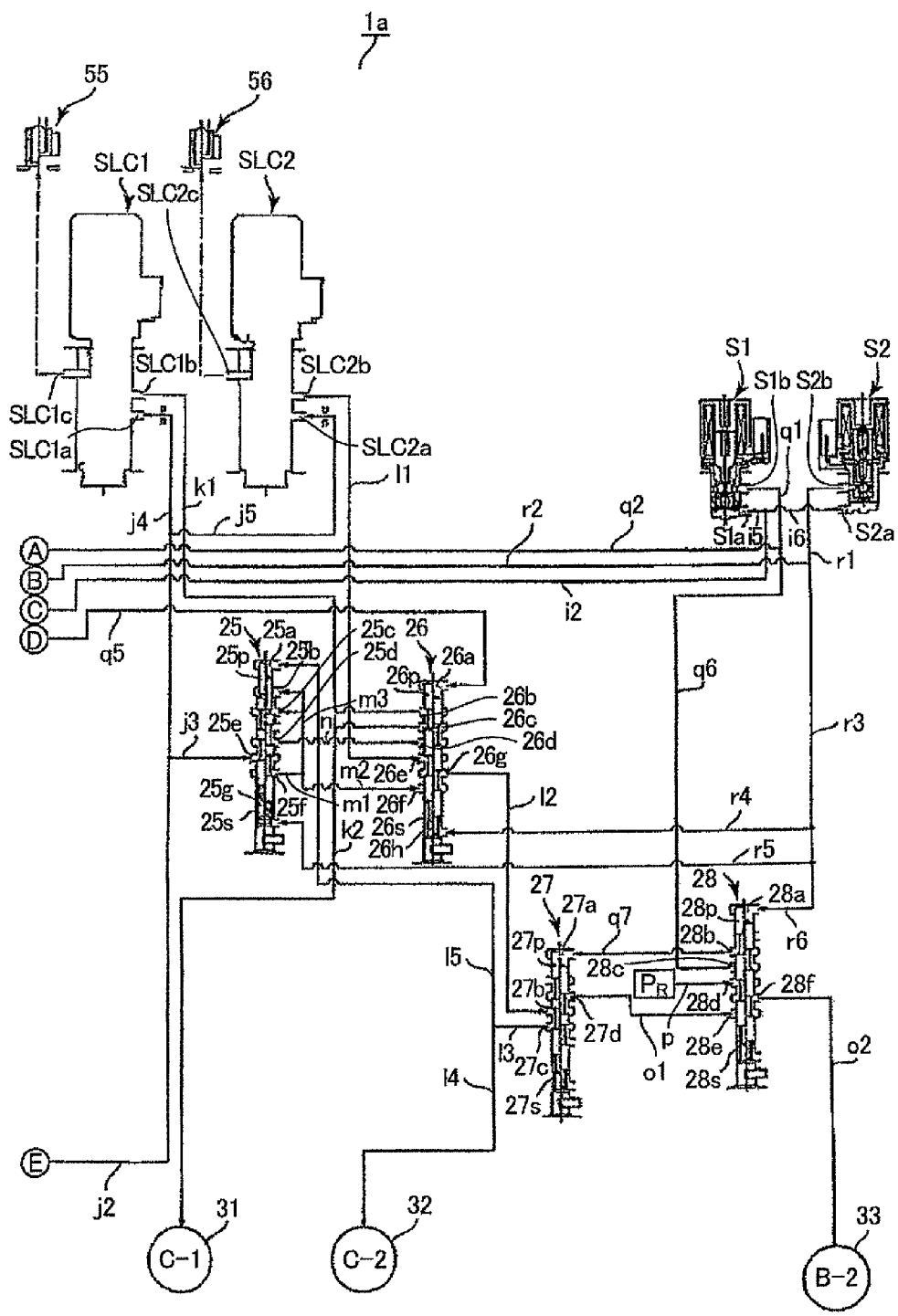
FIG. 3 is a circuit diagram of a shift control portion of the hydraulic control apparatus for an automatic transmission according to the first example embodiment.

On the other hand, as shown in FIG. 3, a linear solenoid valve SLC1 is a normally closed type linear solenoid valve that is in a non-output state when de-energized. This linear solenoid valve SLC1 has an input port SLC1a that receives the forward range pressure PD via oil passages j2 (i.e., a speed change mechanism oil supply passage) (which continues on to E in FIG. 2) and j4 (i.e., a speed change mechanism oil supply passage), an output port SLC1b that regulates the forward range pressure PD and outputs it as engagement pressure PC1 to a hydraulic servo 31, and a drain port SLC1c. That is, when de-energized, the linear solenoid valve SLC1 is placed in a non-output state in which the input port SLC1a is cut off from the output port SLC1b and the output port SLC1b is communicated with the drain port SLC1c. When energized in response to a command signal from the control portion 200 (ECU), the amount (i.e., the opening amount) by which the input port SLC1a is communicated with the output port SLC1b is increased according to the command value. That is, the linear solenoid valve SLC1 is structured so as to be able to output an engagement pressure PC1 that corresponds to the command value. The output port SLC1b of the linear solenoid valve SLC1 is connected to an input port 26b of a second clutch apply relay valve 26, which will be described later, via an oil passage k1 (i.e., a speed change mechanism oil supply passage). Incidentally, the drain port SLC1c is connected to a check valve 55 which prevents air from mixing in when in the non-output state.

Also, similarly, a linear solenoid valve SLC2 is also a normally closed type linear solenoid valve that is in a non-output state when de-energized. This linear solenoid valve SLC2 has an input port SLC2a that receives the forward range pressure PD via the oil passages j2 and j5 (i.e., speed change mechanism oil supply passages), an output port SLC2b that regulates the forward range pressure PD and outputs it as engagement pressure PC2 to a hydraulic servo 32 (or outputs it as engagement pressure PB2 to a hydraulic servo 33 via a C-2 relay valve 27, which will be described later), and a drain port SLC2c. That is, when de-energized, the linear solenoid valve SLC2 is placed in a non-output state in which the input port SLC2a is cut off from the output port SLC2b and the output port SLC2b is communicated with the drain port SLC2c. When energized in response to a command signal from a control portion (ECU), not shown, the amount (i.e., the opening amount) by which the input port SLC2a is communicated with the output port SLC2b is increased according to the command value. That is, the linear solenoid valve SLC2 is structured so as to be able to output an engagement pressure PC2 (or engagement pressure PB2) that corresponds to the command value. The output port SLC2b of the linear solenoid valve SLC2 is connected to an input port 26e of the second clutch apply relay valve 26, which will be described later, via an oil passage 11 (i.e., a speed change mechanism oil supply passage). Incidentally, the drain port SLC2c is connected to a check valve 56 which prevents air from mixing in when in the non-output state.

Incidentally, this hydraulic control apparatus 1a includes a linear solenoid valve SLC3 that regulates and outputs engagement pressure PC3 to a hydraulic servo of the clutch C-3, not shown, and a linear solenoid valve SLB1 that regulates and outputs engagement pressure PB1 to a hydraulic servo of the brake B-1, also not shown. In particular, the linear solenoid valve SLC3 is a normally open type linear solenoid valve that makes the line pressure PL the base pressure. This linear solenoid valve SLC3 is structured to engage the clutch C-3 by outputting the engagement pressure PC3 to the hydraulic servo of the clutch C-3 in the event of an all off failure, which will be described later.

The solenoid valve (i.e., a signal solenoid valve) S1 is a normally open type solenoid valve that is in the output state when de-energized. This solenoid valve S1 has an input port S1a that receives modulator pressure PMOD from the solenoid modulator valve 24 via the oil passages i1, i2, and i5 (see FIG. 2), and an output port S1b that outputs the modulator pressure PMOD generally as it is as signal pressure PS1 when deenergized (i.e., when OFF). The output port S1b is connected to an oil chamber 22a of the first circulation relay valve 22, which will be described later, via oil passages q1, q2 (which continues on to A in FIG. 2), and q3 (see FIG. 2), and is also connected to an oil chamber 26a of the second clutch apply relay valve 26, which will be described later, via an oil passage q4, the second circulation relay valve 23, which will be described later, and an oil passage q5 (which continues on to D in FIG. 2). Further, the output port S1b is connected to an oil chamber 27a of a C-2 relay valve 27, which will be described later, via an oil passage q6, a B-2 relay valve 28 that will be described later, and an oil passage q7.

The solenoid valve S2 is a normally closed type solenoid valve that is in a non-output state when de-energized. This solenoid valve S2 has an input port S2a that receives the modulator pressure PMOD via the oil passages i1, i2, and i6, and an output port S2b that outputs the modulator pressure PMOD generally as it is as signal pressure PS2 when energized (i.e., when ON). The output port S2b is connected to an oil chamber 22b of the first circulation relay valve 22, which will be described later, via oil passages r1 and r2 (which continues on to B in FIG. 2) (see FIG. 2), and is also connected to an oil chamber 26h of the second clutch apply relay valve 26, which will be described later, via oil passages r3 and r4. Further, the output port S2b is connected to an oil chamber 25g of a first clutch apply relay valve 25, which will be described later, via an oil passage r5, and is also connected to an oil chamber 28a of a B-2 relay valve 28, which will be described later, via an oil passage r6.

A first clutch apply relay valve (i.e., a failsafe valve) 25 includes a spool 25p and a spring 25s that urges the spool 25p upward in the drawing, as well as an oil chamber 25a above the spool 25p in the drawing, an oil chamber 25g below the spool 25p in the drawing, and oil chambers 25b and 25c that are formed by the difference in the diameters of the land portions of the spool 25p (i.e., the difference in the pressure receiving area). Further, the first clutch apply relay valve 25 has an input port 25e, an output port 25d, and an output port 25f.

The oil chamber 25a is connected to the hydraulic servo 32 of the clutch C-2 via oil passages 14 and 15. The oil passage 25g is connected to the output port S2b of the solenoid valve S2 via oil passages r1, r3, and r5. The forward range pressure PD is input to the input port 25e via oil passages j2 and j3 and the output port 25d is connected to an input port 26d of the second clutch apply relay valve 26 via an oil passage n. Also, the output port 25f is connected to the oil chambers 25b and 25c via oil passages m1 and m3.

In the first forward speed to the third forward speed (i.e., when the clutch C-2 is not engaged), for example, when the spool 25p of the first clutch apply relay valve 25 is placed in the left-hand position by the urging force of the spring 25s and the signal pressure PS2 of the solenoid valve S2 that is input to the oil chamber 25g, the input port 25e is communicated with the output port 25d, such that the forward range pressure PD that is being input to the input port 25e is output from the output port 25d. During normal operation at times other than when there is an all off failure, which will be described in detail later, the forward range pressure PD that has been output to the oil passage n is blocked at the input port 26d of the second clutch apply relay valve 26.

Also, when the clutch C-2 is engaged in the fourth forward speed to the sixth forward speed, for example, and the spool 25p is placed in the right-hand position by the engagement pressure PC2 of the hydraulic servo 32 of the clutch C-2 that is input to the oil chamber 25a, the input port 25e is communicated with the output port 25f, such that the forward range pressure PD that is being input to the input port 25e is output from the output port 25f and input to the oil chambers 25b and 25c, thereby locking the spool 25p in the right-hand position. Similarly, during normal operation, the forward range pressure PD that has been output to the oil passage m2 is blocked at an input port 26f of the second clutch apply relay valve 26.

The second clutch apply relay valve (i.e., a failsafe valve) 26 includes a spool 26p and a spring 26s that urges the spool 26p upward in the drawing, as well as an oil chamber 26a above the spool 26p in the drawing, and an oil chamber 26h below the spool 26p in the drawing. Further, the second clutch apply relay valve 26 is formed having an input port 26b, an output port 26c, an input port 26d, an input port 26e, an output port 26g, and an input port 26f.

During normal operation, the spool 26p of the second clutch apply relay valve 26 is in the left-hand position by the urging force of the spring 26s (and the signal pressure PS2 of the solenoid valve S2 input to the oil chamber 26h). Therefore, the input port 26b is communicated with the output port 26c, and the input port 26e is communicated with the output port 26g, while the input port 26d and the input port 26f are both blocked off. As a result, the engagement pressure PC1 that has been output from the output port SLC1b of the linear solenoid valve SLC1 is supplied from oil passage k1 to oil passage k2 (which is a speed change mechanism oil supply passage) and thus to the hydraulic servo 31 of the clutch C-1. Also, the engagement pressure PC2 that has been output from the output port SLC2b of the linear solenoid valve SLC2 is supplied from the oil passage 11 to the oil passage 12 (which is a speed change mechanism oil supply passage), and then to the oil passages 13 and 14 (which are speed change mechanism oil supply passages) via the C-2 relay valve 27, which will be described later, so as to be supplied to the hydraulic servo 32 of the clutch C-2, or is supplied to the hydraulic servo 33 of the brake B-2 via the C-2 relay valve 27, which will be described later, an oil passage o1 (which is a speed change mechanism oil supply passage), the B-2 relay valve 28, which will be described later, and an oil passage o2 (which is a speed change mechanism oil supply passage).

Incidentally, if there is a solenoid all off failure in which all of the solenoid valves become de-energized due to an ECU failure or the like, the signal pressure PS1 of the solenoid valve S1 which is normally open is input to the oil chamber 26a via oil passages q1, q2, q4, and q5, thus placing the spool 26p in the right-hand position. Accordingly, the input port 26d is communicated with the output port 26c, and the input port 26f is communicated with the output port 26g. If the spool 25p of the first clutch apply relay valve 25 is in the left-hand position at this time, the forward range pressure PD that has been output to the oil passage n is output from the output port 26c to the oil passage k2 via the input port 26d, and is supplied to the hydraulic servo 31 of the clutch C-1. Also, if the spool 25p of the first clutch apply relay valve 25 is in the right-hand position, the forward range pressure PD that has been output to the oil passage m2 is output from the output port 26g to the oil passage 12 via the input port 26f, and is supplied to the hydraulic servo 32 of the clutch C-2 via the C-2 relay valve 27, which will be described later, and the oil passages 13 and 14.

Also, if an all off failure occurs, line pressure PL is supplied as it is as engagement pressure PC3 from a linear solenoid valve SLC3, not shown, that is normally open to the hydraulic servo of the clutch C-3, such that the clutch C-3 becomes engaged. Therefore, when the spool 25p of the first clutch apply relay valve 25 is in the left-hand position, the clutch C-1 and the clutch C-3 are engaged so the third forward speed can be established, and when the spool 25p is in the right-hand position, the clutch C-2 and the clutch C-3 are engaged so the fifth forward speed can be established. As a result, the running state can be ensured even if an all off failure occurs.

The C-2 relay valve 27 has a spool 27p and a spring 27s that urges the spool 27p upward in the drawing, as well as an oil chamber 27a above the spool 27p in the drawing. In addition, the C-2 relay valve 27 is formed having an input port 27b, an output port 27c, and an output port 27d.

When the spool 27p of the C-2 relay valve 27 is placed in the left-hand position by the urging force of the spring 27s, the input port 27b is communicated with the output port 27c. That is, the engagement pressure PC2 of the linear solenoid valve SLC2 that is supplied to the oil passage 12 (i.e., the forward range pressure PD from the first clutch apply relay valve 25 during an all off failure) is supplied to the hydraulic servo 32 of the clutch C-2 via oil passages 13 and 14 so as to apply the clutch C-2, and is also supplied to the oil chamber 25a of the first clutch apply relay valve 25 via an oil passage 15, thus placing the first clutch apply relay valve 25 in the left-hand position.

Also, when the C-2 relay valve 27 is placed in the right-hand position by the signal pressures PS1 and PS2 being output together from the solenoid valve S1 and the solenoid valve S2, such that the B-2 relay valve 28, which will be described later, is placed in the right-hand position, and as a result, the signal pressure PS1 is input to the oil chamber 27a via the oil passages q1, q6, and q7, the input port 27b is communicated with the output port 27d, such that the engagement pressure PB2 of the linear solenoid valve SLC2 that is supplied to the oil passage 12 is supplied to the hydraulic servo 33 of the brake B-2 via the oil passage o1, the B-2 relay valve 28 that will be described later, and the oil passage o2 to engage the brake B-2.

The B-2 relay valve 28 has a spool 28p and a spring 28s that urges the spool 28p upward in the drawing, as well as an oil chamber 28a above the spool 28p in the drawing. In addition, the B-2 relay valve 28 is formed having an output port 28b, an input port 28c, an input port 28d, and an input port 28e, and an output port 28f.

When the spool 28p of the B-2 relay valve 28 is placed in the left-hand position by the urging force of the spring 28s, the input port 28d is communicated with the output port 28f, and the input port 28c and the input port 28e are closed off. In the reverse range (i.e., the R-range), for example, reverse range pressure PR from a manual valve, not shown, is input via an oil passage p and supplied to the hydraulic servo 33 of the brake B-2 via the oil passage o2 to engage the brake B-2. Incidentally, in this state, even if signal pressure PS1 is output from the solenoid valve S1, it will be blocked at the input port 28c, so that signal pressure PS1 is prevented from being supplied to the oil chamber 27a of the C-2 relay valve 27.

Also, when signal pressure PS2 of the solenoid valve S2 is input to the oil chamber 28a via oil passages r1, r3, and r6 such that the spool 28p is placed in the right-hand position, the input port 28c is communicated with the output port 28b, and the input port 28e is communicated with the output port 28f. Therefore, the signal pressure PS1 that has been output from the solenoid valve S1 to the oil passage q6 is supplied to the oil chamber 27a of the C-2 relay valve 27 via the oil passage q7, which places the C-2 relay valve 27 in the right-hand position, and engagement pressure PB2 from the linear solenoid valve SLC2 that is supplied to the oil passage of via the C-2 relay valve 27, which is in the right-hand position, is supplied to the oil passage o2, and thus the hydraulic servo 33 of the brake B-2, to engage the brake B-2.

Continuing on, the supply path of the engagement pressure PSLU to the starting clutch 3 of the starting apparatus 5 which is the main portion of the present invention, and the supply/discharge path of the circulating oil with respect to the fluid coupling 4 of the starting apparatus 5 will be described.

As shown in FIG. 2, the linear solenoid valve (i.e., the second pressure regulating solenoid valve) SLU is a normally closed type linear solenoid valve that is in the non-output state when de-energized. This linear solenoid valve SLU has an input port SLUa that receives the line pressure PL via the oil passage a7, an output port SLUb that regulates the line pressure PL and outputs it as engagement pressure PSLU, and a drain port SLUc. That is, when de-energized, the linear solenoid valve SLU is in a non-output state in which the input port SLUa is cut off from the output port SLUb and the output port SLUb is communicated with the drain port SLUc. When energized in response to a command signal from the control portion 200 (ECU), the amount (i.e., the opening amount) by which the input port SLUa is communicated with the output port SLUb is increased according to the command value. That is, the linear solenoid valve SLU is structured so as to be able to output an engagement pressure PLSU that corresponds to the command value. The output port SLUb of the linear solenoid valve SLU is connected to the oil chamber 23a of the second circulation relay valve 23, which will be described later, via oil passages h1 and h2, and is also connected to the hydraulic servo 3a of the starting clutch 3 via the oil passages h1, an oil passage h3 and an input path 5a of the starting apparatus 5. That is, by increasing that engagement pressure PSLU, the engagement state of the starting clutch 3 is controlled according to the difference between the pressure of the circulating oil and the engagement pressure PSLU that is supplied to the hydraulic servo 3a. If the engagement pressure PSLU becomes greater than the pressure of the circulating oil, a piston of the starting clutch 3 is pushed to the right in the drawing and thus the starting clutch 3 is engaged. Incidentally, the drain port SLUc is connected to a check valve 54 which prevents air from mixing in when in the non-output state. Also, an accumulator 40 is connected to the oil passage h3 via an oil passage h4, such that surge pressure and pressure pulsations in the hydraulic pressure to the hydraulic servo 3a of the starting clutch 3 can be absorbed.

Meanwhile, the modulator valve (i.e., a circulation pressure stabilizing device) 21 has a spool 21p and a spring 21s that urges the spool 21p in one direction (i.e., upward in the drawing), as well as an input port 21a that receives line pressure PL, an output port 21b that regulates and outputs the line pressure PL, and an oil chamber 21c that receives the output hydraulic pressure as feedback pressure and is formed in a position in which the feedback pressure opposes the urging force of the spring 21s. If the line pressure PL is less than a predetermined pressure, the line pressure PL that is input to the input port 21a is output as it is as circulation pressure PCIR from the output port 21b. If, on the other hand, the line pressure PL is equal to or greater than the predetermined pressure, the urging force of the spring 21s is overcome by the feedback pressure input to the oil chamber 21c via the oil passages d1 and d2, such that the spool 21p moves downward in the drawing. As a result, the line pressure PL input to the input port 21a is regulated to a substantially constant pressure and output as circulation pressure PCIR. This circulation pressure PCIR is supplied to an input path 5b of the starting apparatus 5 via the oil passage d1, a check valve 50, and an oil passage d3. That is, the circulation pressure PCIR is supplied as internal pressure for the fluid coupling 4. In other words, a supply path for the circulating oil (i.e., a circulating oil supply path) is formed by the oil passage a5, the modulator valve 21, and the oil passages d1 and d3.

Also, an oil passage e (i.e., a circulating oil discharge passage) having an orifice 60 therein is connected to the output path 5c of the starting apparatus 5. This oil passage e is connected to an input port 22d of the first circulation relay valve (i.e., a second flow rate changing valve) 22 as the second flow rate changing device (see FIG. 1). The first circulation relay valve 22 has a spool 22p and a spring 22s that urges the spool 22p upward in the drawing, as well as an oil chamber 22a above the spool 22p in the drawing, and an oil chamber 22b below the spool 22p in the drawing. The first circulation relay valve 22 is also formed having an output port 22c, an input port 22d that is connected to the oil passage e, an output port 22e, and an input port 22f.

The oil chamber 22a is connected to an output port S1b of the solenoid valve S1 described above via oil passages q1, q2, and q3. The oil chamber 22b is connected to the output port S2b of the solenoid valve S2 via oil passages r1 and r2. An output path 5c of the starting apparatus 5 is connected to the input port 22d via the oil passage e. The back-pressure output port 20f of the primary regulator valve 20 is connected to the input port 22f via an oil passage c, such that the back pressure of the line pressure PL is input to that input port 22f. Also, the output port 22c is connected to an input port 23b of the second circulation relay valve (i.e., a first flow rate changing valve) 23 as the first flow rate changing device (see FIG. 1) via an oil passage g1 that has an orifice 61 therein. The output port 22e is connected to oil passages f1 to f8 in which the oil cooler 10 is interposed, and ultimately connected to the lubricating oil passage 11.

When the spool 22p of the first circulation relay valve 22 that serves as the second flow rate changing device (see FIG. 1) is placed in the left-hand position by the urging force of the spring 22s (and the signal pressure PS2 of the solenoid valve S2 input to the oil chamber 22b), the input port 22d is communicated with the output port 22c and the input port 22f is communicated with the output port 22e, such that circulating oil that flows in from the input port 22d flows out from the output port 22c to the second circulation relay valve 23 (i.e., the first flow rate changing device), which will be described in detail later, via an oil passage g1, and back pressure of the line pressure PL input to the input port 22f is output to the oil passages f1 to f8 in which the oil cooler 10 is interposed (and ultimately the lubricating oil passage 11).

Also, when the spool 22p is placed in the right-hand position by the signal pressure PS1 of the solenoid valve S1 input to the oil chamber 22a, the input port 22d is communicated with the output port 22e, and the input port 22f and the output port 22c are closed off, such that circulating oil that flows in from the input port 22d is output to the oil passages f1 to f8 in which the oil cooler 10 is interposed (and ultimately the lubricating oil passage 11).

Incidentally, the oil passage f1 that is connected to the output port 22e is connected to the oil cooler 10 via the oil passage f2, and is also connected to the lubricating oil passage 11 via the oil passages f4, f5, f6, and f8. Also, a check valve 51 is connected to the oil passage f1 via the oil passage f3. When this check valve 51 is open, a bypass is created from the oil passage f1 to the oil passage f8 via the oil passage f3 and f7. That is, when the resistance of the oil cooler 10 is large due to the oil temperature being low such that the oil viscosity is high, for example, the check valve 51 opens from the pressure generated by that resistance. That is, when the oil temperature is low, the oil does not need to pass through the oil cooler 10, so the oil is supplied to the lubricating oil passage 11.

The second circulation relay valve 23 that serves as the first flow rate changing device (see FIG. 1) has a spool has a spool 23p and a spring 23s that urges the spool 23p upward in the drawing, as well as an oil chamber 23a above the spool 23p in the drawing. The second circulation relay valve 23 is also formed having the input port 23b that is connected to the oil passage g1, an output port 23c, an output port 23d, an input port 23e, and an output port 23f.

The oil chamber 23a is connected to the output port SLUb of the linear solenoid valve SLU described above via oil passages h1 and h2. The oil passage g1 is connected to the input port 23b, the oil passage g2 (i.e., a first flow rate changing device and a small flow rate oil passage) having therein a small diameter orifice (i.e., a flow rate regulating member) 62 is connected to the output port 23c, and the oil passage g3 (i.e., a first flow rate changing device and a large flow rate oil passage) having therein an orifice (i.e., a flow rate regulating member) 63 that has a larger diameter than the orifice 62 is connected to the output port 23d. The oil passages g2 and g3 both open into the oil pan, not shown. Also, the input port 23e is connected to the output port S1b of the solenoid valve S1 via the oil passages q1, q2, and q4, and the output port 23f is connected to the oil chamber 26a of the second clutch apply relay valve 26 via the oil chamber q5. Incidentally, the orifice 61 has a diameter that is even larger than the diameters of the orifices 62 and 63. That is, the diameter of the orifice 61 is larger than the diameter of the orifice 63, and the diameter of the orifice 63 is larger than the diameter of the orifice 62. Therefore, although the flow rate is regulated by the orifice 61 in the oil passage g1, the flow rate is not restricted more than it is in the oil passages g2 and g3, so flow of oil will not be impeded.

When the spool 23p of the second circulation relay valve 23 is placed in the left-hand position by the urging force of the spring 23s, the input port 23b is communicated with the output port 23c, such that the circulating oil that flows in from the input port 23b flows out to the oil passage g2 from the output port 23c. Also, when the spool 23p is in the left-hand position, the input port 23e is communicated with the output port 23f, such that when the signal pressure PS1 is output from the solenoid valve S1, that signal pressure PS1 is supplied to the oil chamber 26a of the second clutch apply relay valve 26.

Also, when the spool 23p is placed in the right-hand position by the engagement pressure PSLU of the linear solenoid valve SLU that is input to the oil chamber 23a being increased so that it overcomes the urging force of the spring 23s, the input port 23b is communicated with the output port 23d, such that the circulating oil that flows in from the input port 23b flows out to the oil passage g3 from the output port 23d. Also, when the spool 23p is in the right-hand position, the input port 23e and the output port 23f are closed off, so even if the signal pressure PS1 is output from the solenoid valve S1, that signal pressure PS1 will not be supplied to the oil chamber 26a of the second clutch apply relay valve 26.

Incidentally, although a detailed sectional view is omitted, the oil passage d3 that serves as the circulating oil supply passage to the starting apparatus 5 described above, the oil passage e that serves as the circulating oil discharge passage, and the oil passage h3 that supplies the engagement pressure PSLU are such that oil is actually supplied and discharged using oil passages bored in the transmission case, the oil pump unit, and the input shaft 6a and the like from the hydraulic control apparatus 1a.

Next, the circulating oil discharge path switching control of the hydraulic control apparatus 1a structured as described above will be described with reference to the flowchart in FIG. 4, in addition to FIGS. 1 to 3.

Figure 4:
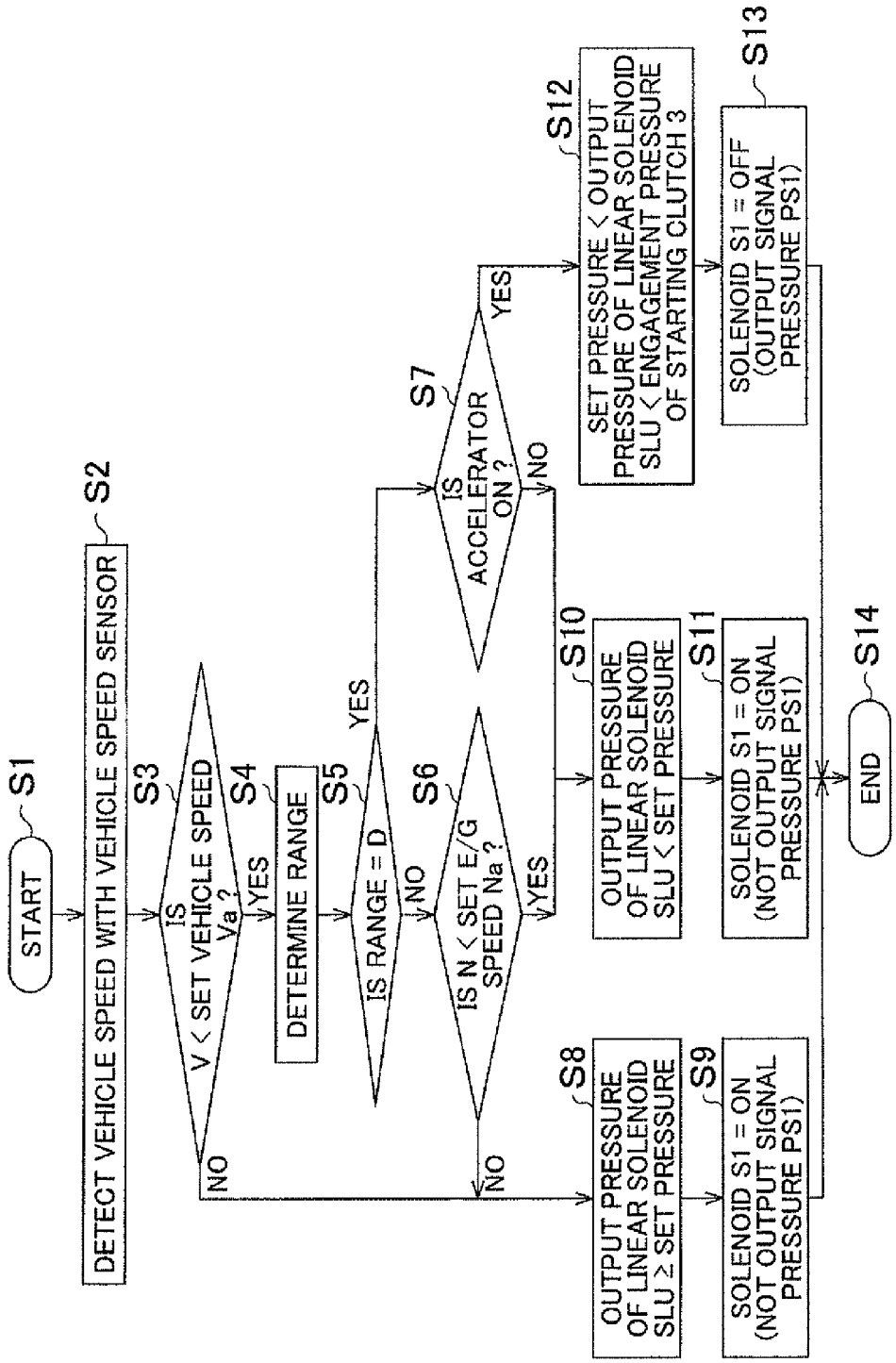
FIG. 4 is a flowchart illustrating hydraulic control of the automatic transmission according to the first example embodiment.

As shown in FIG. 4, the circulating oil discharge path switching control according to this example embodiment of the present invention starts (S1) in the control portion (ECU) 200 when the ignition switch is turned on, for example. First, the vehicle speed is detected by an output shaft rotation speed sensor (i.e., a vehicle speed sensor), not shown, (S2). If the vehicle speed V is less than a set vehicle speed (i.e., a predetermined vehicle speed) Va (when the vehicle is almost stopped) (YES in S3), the shift range that the shift lever, not shown, is in is detected (S4) and it is determined whether the D (Drive)-range is selected (S5). If the D-range is not selected (i.e., NO in S5), for example, it is determined whether the engine speed N is less than a set engine speed (i.e., rotation speed) Na (S6). If the engine speed N is less than the set engine speed Na (YES in S6), then it is possible that the driver is parking the vehicle in a garage or the like, for example, and thus will frequently switch between a non-running range (i.e., the N-range or the P-range) and a running range (i.e., the R-range or the D-range), i.e., that a so-called garage shift is being performed, so the process proceeds on to step S10 which will be described later. Also, if it is determined in step S5 that the D-range is selected (i.e., YES in S5), then it is determined whether the accelerator is on according to an accelerator operation amount sensor, not shown (S7). If, for example, the accelerator is not on, i.e., if the accelerator is off (i.e., NO in S7), the process proceeds on to step S10 which will be described later.

That is, if a range other than the D-range is selected and the engine speed N is less than the set engine speed Na, or if the accelerator is off even though the D-range is selected, it is highly likely that engagement/release control of the clutches and brakes will be performed frequently due to a so-called garage shift being performed. However, the vehicle speed is equal to or less than the set vehicle speed Va, and more particularly, the engine speed N is less than the set engine speed Na. As a result, the rotation speed of the oil pump 7 that operates in conjunction with the engine 100 is low so the amount of oil discharged from the oil pump 7 is small. Therefore, in this state, the first flow rate instructing portion 201 (see FIG. 1) of the control portion 200 outputs a command so that the engagement pressure PSLU output from the linear solenoid valve SLU becomes less than the set pressure (S10). Further, the second flow rate instructing portion 202 (see FIG. 1) outputs a command so that the signal pressure PS1 is not output from the solenoid valve S1 (i.e., so that the solenoid valve S1 turns on) (S11), after which the process ends (S14).

As a result, as shown in FIG. 2, the first circulation relay valve 22 as the second flow rate changing device (see FIG. 1) is placed in the left-hand position, and the second circulation relay valve 23 as the first flow rate changing device (see FIG. 1) is also placed in the left-hand position. Accordingly, the circulating oil that has flowed out from the output path 5c of the starting apparatus 5 is discharged via the oil passage e, the first circulation relay valve 22, the oil passage g1, the second circulation relay valve 23, and the oil passage g2. That is, in this state, the circulating oil that has flowed out from the output path 5c of the starting apparatus 5 is discharged via the orifice 62 that has the smallest diameter, so the flow resistance is high and the amount of oil that is discharged is restricted to a small amount, which enables the flow rate of the circulating oil that circulates through the starting apparatus 5 to be small. Therefore, even if the amount of oil discharged from the oil pump 7 is small, a large amount of oil will not flow to the starting apparatus 5 side. In other words, a sufficient flow rate for hydraulic control of the clutches and brakes of the speed change mechanism 6 is able to be ensured, so the hydraulic pressure necessary for shifting can be obtained in the speed change mechanism 6, making it possible to prevent the shift duration from becoming long.

If, on the other hand, in step S7 the accelerator is depressed (i.e., accelerator on) when the D-range is selected (i.e., YES in S7), for example, the second flow rate instructing portion 202 of the control portion 200 outputs a command to increase the engagement pressure (i.e., the output pressure) PSLU of the linear solenoid valve SLU such that it becomes equal to or greater than a set pressure but less than an engagement pressure at which the starting clutch 3 engages (S12). Further, the second flow rate instructing portion 202 of the control portion 200 outputs a command to turn the solenoid valve S1 off, i.e., to output the signal pressure PS1 (S13), after which the process ends (S14). As a result, the engagement pressure PSLU in the oil chamber 23a exceeds the urging force of the spring 23s so the second circulation relay valve 23 switches to the right-hand position, as shown in FIG. 2. At this time, the engagement pressure PSLU does not increase enough to engage the starting clutch 3, as described above, so the starting clutch 3 remains released. Then the engagement pressure PS1 in the oil chamber 22a exceeds the urging force of the spring 22s so the first circulation relay valve 22 as the second flow rate changing device (see FIG. 1) switches to the right-hand position.

Incidentally, because the second circulation relay valve 23 is switched to the right-hand position, the signal pressure PS1 to be input to the input port 23e from the solenoid valve S1 via the oil passage q4 is blocked at that input port 23e. Therefore, the signal pressure PS1 is not input to the oil chamber 26a (see FIG. 3) of the second clutch apply relay valve 26 that is connected via the oil passage q5, so the second clutch apply relay valve 26 is maintained in the left-hand position which is the normal position.

In this state, the vehicle speed V is less than the set vehicle speed Va, so power is transmitted via the fluid coupling 4, and the difference in rotation speed between the engine 100 and the input shaft 6a of the speed change mechanism 6 is absorbed, and the heating value is large. Also in this state, the accelerator is depressed so it is unlikely that a garage shift will be performed, i.e., it is unlikely that engagement/release control of the clutches and brakes will be performed. Therefore, the circulating oil that has flowed out from the output path 5c of the starting apparatus 5 is discharged via the oil passage e, the first circulation relay valve 22, the oil passages f1 to f8, and the oil cooler 10, i.e., is discharged by the path without the orifices 61, 62, and 63 and thus with the least flow resistance. As a result, the maximum amount of oil is able to be discharged because the flow resistance is low, so the cooling efficiency of the starting apparatus 5 can be increased, and the circulating oil that has circulated through the heated starting apparatus 5 can be immediately sent to the oil cooler 10 and cooled. As a result, it is possible to prevent insufficient cooling of the starting apparatus 5, and thus possible to improve the durability of the starting apparatus 5.

On the other hand, if for example the vehicle speed V is equal to or greater than the set vehicle speed Va, i.e., if the vehicle has started off and is running (i.e., NO in S3), and if the engine speed N is equal to or greater than the set engine speed Na (i.e., NO in S6), then the engine 100 is operating sufficiently so the amount of oil discharged from the oil pump 7 is sufficient, and engagement/release control of the clutches and brakes is not performed frequently so the flow rate in the speed change mechanism 6 is small though sufficient. Therefore, the first flow rate instructing portion 201 (see FIG. 1) of the control portion 200 outputs a command to increase the engagement pressure PSLU of the linear solenoid valve SLU to equal to or greater than the set pressure (S8). Incidentally, at this time, if the vehicle is traveling steadily, the engagement pressure PSLU may be increased to equal to or greater than the engagement pressure of the starting clutch 3 such that the starting clutch 3 engages. Also at this time, the solenoid valve S1 is turned on by the second flow rate instructing portion 202 (see FIG. 1) of the control portion 200 such that the signal pressure PS1 is controlled to a non-output state (S9), after which the process ends (S14). As a result, as shown in FIG. 2, the first circulation relay valve 22 is switched to the left-hand position by the urging force of the spring 22s, and the second circulation relay valve 23 remains in the right-hand position because the engagement pressure PSLU of the oil chamber 23a exceeds the urging force of the spring 23s.

In this state, the engine 100 is operating sufficiently so the amount of oil discharged from the oil pump 7 is sufficient, and the engagement/release control of the clutches and brakes will not performed frequently, as described above, so the circulating oil that has flowed out from the output path 5c of the starting apparatus 5 is discharged via the oil passage e, the first circulation relay valve 22, the oil passage g1, the second circulation relay valve 23, and the oil passage g3. Even if the flow resistance is rather high because the circulating oil is discharged via the large diameter orifice 63, the flow resistance is still lower than it is when the circulating oil is discharged via the oil passage g2 so the amount of oil that is discharged is only moderately restricted. Therefore, the flow rate of the circulating oil can be made normal.

Incidentally, in this state, the back pressure of the line pressure PL is output from the oil passage c to the oil passages f1 to f8 and the oil cooler 10 via the first circulation relay valve 22, such that the lubrication flow rate for the lubricating oil passage 11 is ensured. Also, when the first circulation relay valve 22 is switched from the right-hand position to the left-hand position, the first circulation relay valve 22 can be quickly switched by turning the solenoid valve S2 on to input the signal pressure PS2 into the oil chamber 22b. In particular, in the first forward speed, no problem will arise if the engagement pressure PB2 is supplied from the linear solenoid valve SLC2 to the brake B-2, so the B-2 relay valve 28 may be switched to the right-hand position.

As described above, with the hydraulic control apparatus 1a for an automatic transmission according to this embodiment, the second circulation relay valve 23 as the first flow rate changing device, the oil passage g2 having the orifice 62 therein, and the oil passage g3 having the orifice 63 therein change the flow rate to the starting apparatus 5 according to the amount of oil discharged from the oil pump 7. Therefore, when the amount of oil discharged from the oil pump 7 is small, the flow rate to the starting apparatus 5 can be made small and oil can be preferentially supplied to the speed change mechanism 6. Accordingly, the hydraulic pressure necessary for shifting can be obtained in the speed change mechanism 6 when the amount of oil discharged from the oil pump 7 is small, which makes it possible to prevent the shift duration from becoming long.

Also, the shift duration can be prevented from becoming long without increasing the size of the oil pump 7 or increasing the engine speed. Accordingly, the shift duration can be prevented from becoming long without affecting the fuel efficiency of the vehicle.

Further, the engagement state of the starting clutch 3 is controlled by the difference between the engagement pressure PSLU supplied to the hydraulic servo 3a of the starting clutch 3 and the pressure of the circulating oil. However, the second circulation relay valve 23, the oil passage g2 having the orifice 62 therein, and the oil passage g3 having the orifice 63 therein, which serve as first flow rate changing devices, change the flow rate of the circulating oil in a stepped manner, so control of the starting clutch 3 is easier than it is when the flow rate of the circulating oil is changed in a continuous manner.

Moreover, the circulating oil of the starting apparatus 5 is supplied based on the line pressure PL that has been regulated by the primary regulator valve 20 and the linear solenoid valve SLT. However, the second circulation relay valve 23, the oil passage g2 having the orifice 62 therein, and the oil passage g3 having the orifice 63 therein, which serve as first flow rate changing devices, change the flow rate such that the flow rate of the circulating oil becomes smaller when the amount of oil discharged from the oil pump 7 is small. Therefore, oil that is based on the line pressure PL can be preferentially supplied to the speed change mechanism 6, such that the hydraulic pressure necessary for shifting can be obtained in the speed change mechanism 6 when the amount of oil discharged from the oil pump 7 is small, which makes it possible to prevent the shift duration from becoming long.

Also, the second circulation relay valve 23, the oil passage g2 having the orifice 62 therein, and the oil passage g3 having the orifice 63 therein, which serve as the first flow rate changing devices, are arranged in the oil passage g1 which serve as circulating oil discharge passages. Therefore, if the first flow rate changing device is arranged in the oil passages d1 and d3 which serve as circulating oil supply passages and the flow rate is reduced, for example, the starting apparatus 5 may not be able to be filled up with circulating oil. However, because the flow rate of the circulating oil that is discharged from the starting apparatus 5 is controlled, the starting apparatus 5 can be reliably filled up with lubricating oil regardless of whether the flow rate is large or small.

Further, the modulator valve 21 that stabilizes the circulation pressure of the circulating oil that is supplied to the starting apparatus 5 is arranged in the oil passages a5, d1, and d3 that serve as circulating oil supply passages. Therefore, the flow rate of the circulating oil can be changed while stabilizing the pressure within the starting apparatus 5, which makes control of the starting clutch 3 even easier. Also, the second circulation relay valve 23, the oil passage g2 having the orifice 62 therein, and the oil passage g3 having the orifice 63 therein, which serve as first flow rate changing devices, are arranged in the oil passages e and g1 that serve as circulating oil discharge passages. Therefore, because the flow rate of the circulating oil that is discharged from the starting apparatus 5 is controlled, the starting apparatus 5 can be reliably filled up with lubricating oil regardless of whether the flow rate is large or small.

Also, the second circulation relay valve 23 is switched between the small flow rate position (i.e., the left-hand position) that communicates the oil passage g1 with the oil passage g2, and the large flow rate position (i.e., the right-hand position) that communicates the oil passage g1 with the oil passage g3, based on the engagement pressure PSLU that is regulated by the linear solenoid valve SLU. Therefore, a new solenoid valve does not need to be provided to switch the second circulation relay valve 23, so the hydraulic control apparatus 1a can be prevented from becoming larger.

Furthermore, the second circulation relay valve 23 is switched from the small flow rate position (i.e., the left-hand position) to the large flow rate position (i.e., the right-hand position) when the engagement pressure PSLU becomes equal to a set pressure that is lower than an engagement starting pressure that engages the starting clutch 3. Therefore, the second circulation relay valve 23 can be switched by the engagement pressure PSLU of the starting clutch 3, and this switching of the second circulation relay valve 23 can be controlled independently of the engagement/disengagement of the starting clutch 3. Incidentally, the engagement starting pressure of the starting clutch 3 is the pressure at which engine torque starts to be transmitted to the speed change mechanism 6 via the starting clutch 3.

Meanwhile, the first circulation relay valve 22 as the second flow rate changing device is interposed between the starting apparatus 5 and the second circulation relay valve 23 in the oil passages e and g1. This first circulation relay valve 22 is switched, according to the heating value of the starting apparatus 5, between a cooler 10 communicating state that communicates the starting apparatus 5 with the cooler oil passages f1 to f8, and a cooler 10 non-communicating state that communicates the starting apparatus 5 with the second circulation relay valve 23. Therefore, the flow rate of the circulating oil can also be switched based on the heating value of the starting apparatus 5, in addition to being switched based on the amount of oil discharged from the oil pump 7.

Also, the first circulation relay valve 22 can be switched between the cooler 10 communicating state (i.e., the right-hand position) and the cooler 10 non-communicating state (i.e., the left-hand position) based on the signal pressure PS1 of the solenoid valve S1 by a command from the second flow rate instructing portion 202.

Further, the second circulation relay valve 23 is interposed between the solenoid valve S1 and the second clutch apply relay valve 26. This second circulation relay valve 23 blocks the signal pressure PS1 to the second clutch apply relay valve 26 when switched to the large flow rate position (i.e., the right-hand position) based on the engagement pressure PSLU of the linear solenoid valve SLU. Therefore, the signal pressure PS1 for switching the second clutch apply relay valve 26 can be used as the signal pressure PS1 for switching the first circulation relay valve 22. That is, a new solenoid valve does not need to be provided to switch the first circulation relay valve 22, so the hydraulic control apparatus 1a can be prevented from becoming larger.

Figure 5:
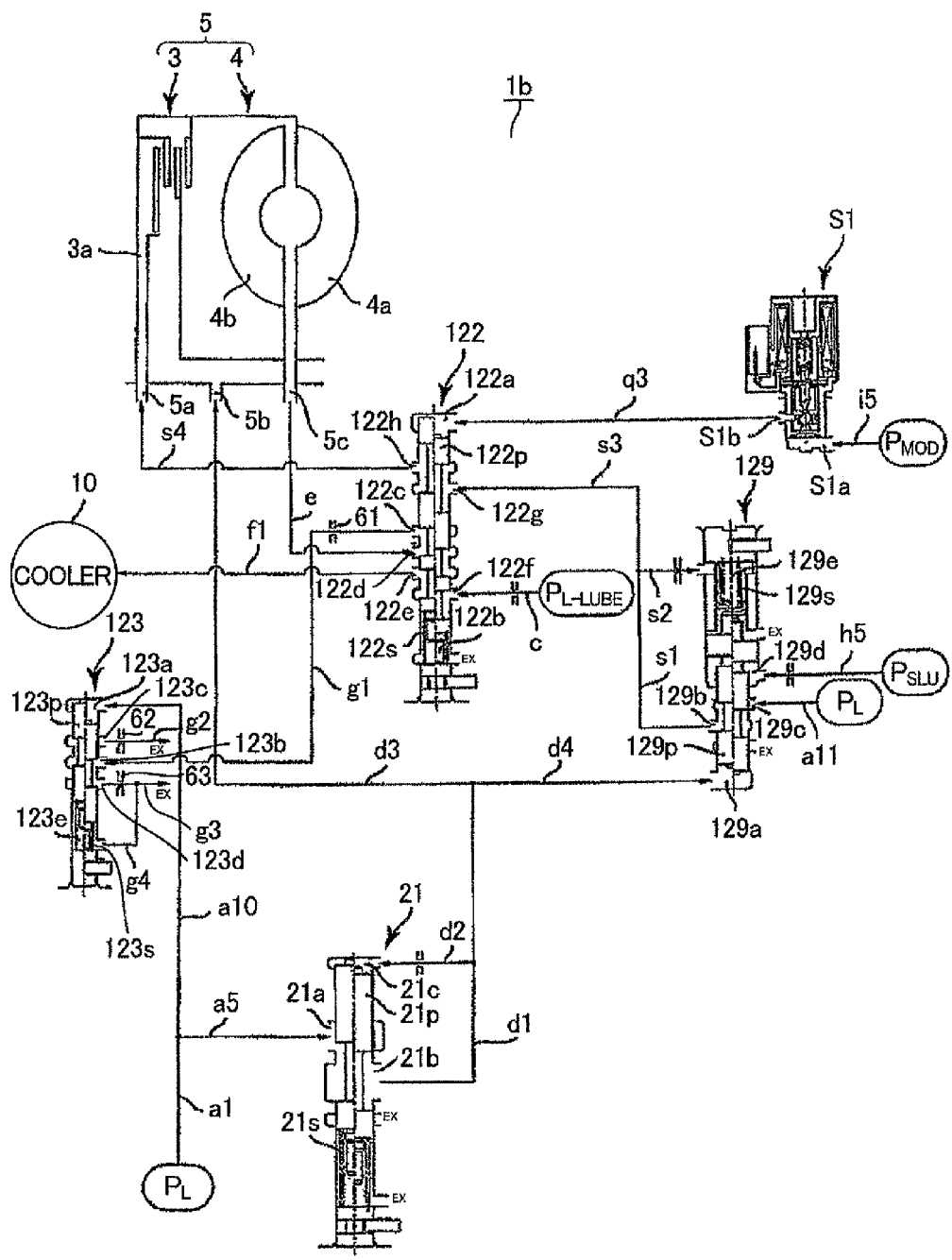
FIG. 5 is a circuit diagram of the main portion of the present invention of a hydraulic control apparatus for an automatic transmission according to a second example embodiment.

Next, a second example embodiment in which part of the first example embodiment described above has been modified will be described with reference to FIGS. 5 and 6. Incidentally, in this description of the second example embodiment, portions that are similar to those in the first example embodiment will be denoted by like reference characters, and descriptions of those portions will be omitted. Also, mainly the portions of a hydraulic control apparatus 1b shown in FIG. 5 that differ from those of the hydraulic control apparatus 1a shown in FIGS. 2 and 3 will be described, though the portions that are omitted in FIG. 5 are actually provided on the hydraulic control apparatus 1b, just as shown in FIGS. 2 and 3.

In the hydraulic control apparatus 1a according to the first example embodiment, the engagement pressure PSLU of the linear solenoid valve SLU is directly supplied to the hydraulic servo 3a of the starting clutch 3. However, in the hydraulic control apparatus 1b according to the second example embodiment, the line pressure PL is regulated and supplied by a control valve 129 based on the control pressure PSLU of the linear solenoid valve SLU. Incidentally, in this second example embodiment, the hydraulic pressure output from the linear solenoid valve SLU is not hydraulic pressure for directly engaging the starting clutch 3, but rather hydraulic pressure for controlling the control valve 129, which is why it is referred to as "control pressure PSLU" and not "engagement pressure PSLU".

Also, in the hydraulic control apparatus 1a according to the first example embodiment, the second circulation relay valve 23 is switched by the engagement pressure PSLU of the linear solenoid valve SLU. However, in the hydraulic control apparatus 1b according to the second example embodiment, a second circulation relay valve (i.e., a first flow rate changing device and the first flow rate changing valve) 123 is able to be changed by the line pressure PL that is regulated based on the control pressure PSLT of the linear solenoid valve SLT (i.e., a first pressure regulating solenoid valve).

Moreover, in the hydraulic control apparatus 1a according to the first example embodiment, the first circulation relay valve 22 is switched by the signal pressure PS1 of the solenoid valve S1 and the signal pressure PS2 of the solenoid valve S2. However, in the hydraulic control apparatus 1b according to the second example embodiment, a first circulation relay valve 122 is switched based only on the signal pressure PS1 of the solenoid valve S1.

Continuing on, the hydraulic control apparatus 1b according to this second example embodiment will be described in detail with reference to FIG. 5. The line pressure PL that is regulated by the primary regulator valve 20 based on the SLT pressure PSLT of the linear solenoid valve SLT that is controlled by a command from the control portion 200 is supplied to oil passages a1, a5, a10, and a11 (i.e., common oil passages). The line pressure PL that is supplied to the oil passage a5, from among these oil passages, is input to the input port 21a of the modulator valve 21.

The modulator valve 21 has a spool 21p and a spring 21s that urges the spool 21 in one direction (i.e., upward in the drawing), as well as an input port 21a that receives the line pressure PL, an output port 21b that regulates and outputs the line pressure PL, and an oil chamber 21c that receives the output hydraulic pressure as feedback pressure and is arranged in a position in which that feedback pressure opposes the pressure of the spring 21s. If the line pressure PL is less than a predetermined pressure, the line pressure PL that is input to the input port 21a is output as it is as circulation pressure PCIR from the output port 21b. If, on the other hand, the line pressure PL is equal to or greater than the predetermined pressure, the urging force of the spring 21s is overcome by the feedback pressure input to the oil chamber 21c via the oil passages d1 and d2, such that the spool 21p moves downward in the drawing. As a result, the line pressure PL input to the input port 21a is regulated to a substantially constant pressure and output as circulation pressure PCIR. This circulation pressure PCIR is supplied to an input path 5b of the starting apparatus 5 via the oil passage d1 and an oil passage d3. That is, the circulation pressure PCIR is supplied as internal pressure for the fluid coupling 4, and is supplied to an oil chamber 129a of the control valve 129, which will be described in detail later, via an oil passage d4.

The control valve 129 has a spool 129p and a spring 129s that urges the spool 129p in one direction (i.e., downward in the drawing), as well as an oil chamber 129a that receives the circulation pressure PCIR, a drain port EX, an output port 129b that regulates the line pressure PL and outputs it as engagement pressure PCONT of the starting clutch 3, an input port 129c that receives the line pressure PL via an oil passage a11, an oil chamber 129d that receives the control pressure PSLU via an oil passage h5, and a feedback oil chamber 129e that receives the output engagement pressure PCONT as feedback pressure and is formed to apply that feedback pressure in the same direction as the urging force of the spring 129s.

In this control valve 129, if the control pressure PSLU of the linear solenoid valve SLU increases in response to a command from the control portion 200, the spool 129p is pushed, i.e., driven, upward in the drawing against the urging force of the spring 129s, such that the amount of communication between the input port 129c and the output port 129b increases. That is, the line pressure PL that is input from the input port 129c is output as engagement pressure PCONT from the output port 129b so that it increases based on the amount of control pressure PSLU. Also, the engagement pressure PCONT that is output from the output port 129b is input to the feedback oil chamber 129e via oil passages s1 and s2 and urges the spool 129p downward in the drawing, which acts to reduce the engagement pressure PCONT if this engagement pressure PCONT becomes too large. That is, feedback of the engagement pressure PCONT is performed.

In this way, the engagement pressure PCONT that is output while being fed back is supplied to the hydraulic servo 3a of the starting clutch 3 via oil passages s3 and s4, and the input path 5a of the starting apparatus 5. By increasing that engagement pressure PCONT, the starting clutch 3 is controlled according to the difference between the engagement pressure PCONT supplied to the hydraulic servo 3a and the pressure of the circulation oil (the circulation pressure PCIR) in the starting apparatus 5. If the engagement pressure PCONT becomes greater than the circulation pressure PCIR, the starting clutch 3 is pushed to the right in the drawing and engaged.

Also, the circulation pressure PCIR is input to the oil chamber 129a of the control valve 129 via the oil passage d4, so fluctuations in the circulation pressure PCIR are reflected in the driving position of the spool 129p. That is, if the circulation pressure PCIR becomes large, the spool 129p will be pushed and driven upward in the drawing such that the engagement pressure PCONT increases. If the circulation pressure PCIR becomes small, the spool 129p is pushed and driven downward in the drawing by the urging force of the spring 129s such that the engagement pressure PCONT decreases. That is, the difference between the engagement pressure PCONT in the starting apparatus 5 and the circulation pressure PCIR is feedback controlled so as not to fluctuate due to fluctuations in the circulation pressure PCIR.

Meanwhile, the solenoid valve S1 in this second example embodiment is a normally closed type solenoid valve that is in an output state when energized. The solenoid valve S1 has an input port S1a that receives modulator pressure PMOD from a solenoid modulator valve 24 (see FIG. 2) via an oil passage i5, and an output port S1b that outputs the modulator pressure PMOD substantially as it is as signal pressure PS1 when energized (i.e., when on). The output port S1b is connected to an oil chamber 122a of a first circulation relay valve 122 as the second flow rate changing device (see FIG. 1) via an oil passage q3. Incidentally, the solenoid valve S1 may of course also be formed by a normally open type solenoid valve that is in an output state when deenergized, similar to the first example embodiment.

The first circulation relay valve 122 has a spool 122p and a spring 122s that urges the spool 122p upward in the drawing, as well as an oil chamber 122a above the spool 122p in the drawing, and an oil chamber 122b below the spool 122p in the drawing. The first circulation relay valve 122 is also formed having an output port 122c, an input port 122d that is connected to an oil passage e, an output port 122e, an input port 122f, an input port 122g, and an output port 122h. Of these ports, the input port 122g and the output port 122h are formed so as to be communicated with each other during normal operation regardless of the position of the spool 122p, such that the engagement pressure PCONT from the control valve 129 is communicated with the hydraulic servo 3a of the starting clutch 3 during normal operation.

Incidentally, when the starting clutch 3 is used as a lock-up clutch and lockup ON/OFF control is performed by the first circulation relay valve 122, the shape of the spool 122p is changed such the input port 122g is blocked off when the spool 122p is in the left-hand position, and the input port 122g is communicated with the output port 122h when the spool 122p is in the right-hand position. That is, a case in which the starting clutch 3 is used as a lock-up clutch can be easily be accommodated simply by changing the shape of the spool 122p.

Meanwhile, the oil chamber 122a is connected to the output port S1b of the solenoid valve S1 via an oil passage q3, and the oil chamber 122b is open to the drain port EX. An output path 5c of the starting apparatus 5 is connected to the input port 122d via the oil passage e, and the back-pressure output port 20f of the primary regulator valve 20 is connected to the input port 122f via an oil passage c (see FIG. 2), such that back pressure PL-LUBE of the line pressure PL is input to the input port 122f. Also, the output port 122c is connected to an input port 123b of the second circulation relay valve 123 as the first flow rate changing device (see FIG. 1) via an oil passage g1 that has an orifice 61 therein. The output port 122e is connected to an oil passage f1 in which the oil cooler 10 is interposed, and is ultimately connected to the lubricating oil passage 11 (see FIG. 2).

The second circulation relay valve 123 that serves as a first flow rate changing device (see FIG. 1) has a spool 123p and a spring 123s that urges the spool 123p upward in the drawing, as well as an oil chamber 123a above the spool 123p in the drawing. The second circulation relay valve 123 is also formed having an input port 123b that is connected to the oil passage g1, an output port 123c, an output port 123d, and an oil chamber 123e.

The oil chamber 123a receives line pressure PL that is controlled based on the control pressure PSLT of the linear solenoid valve SLT, via an oil passage a10. The oil passage g1 is connected to the input port 123*b*, the oil passage g2 (i.e., a small flow rate oil passage) having therein a small diameter orifice 62 is connected to the output port 123*c*, and an oil passage g3 (i.e., a large flow rate oil passage) having therein an orifice 63 that has a larger diameter than the orifice 62 is connected to the output port 123*d*. The oil passages g2 and g3 both open into the oil pan, not shown. Also, the input port 123*e* is connected to the output port 123*d* via oil passages g3 and g4. Incidentally, just as in the first example embodiment, the orifice 61 has a diameter that is even larger than the diameters of the orifices 62 and 63. That is, the diameter of the orifice 61 is larger than the diameter of the orifice 63, and the diameter of the orifice 63 is larger than the diameter of the orifice 62. Therefore, although the flow rate is regulated by the orifice 61 in the oil passage g1, the flow rate is not restricted more than it is in the oil passages g2 and g3, so flow of oil will not be impeded.

When the spool 123*p* of the second circulation relay valve 123 is placed in the left-hand position by the urging force of the spring 123*s*, the input port 123*b* is communicated with the output port 123*c*, such that circulating oil that flows in from the input port 123*b* flows out to the oil passage g2 from the output port 123*c*. Also, if the line pressure PL input to the oil chamber 123*a* becomes equal to or greater than a predetermined pressure, it overcomes the urging force of the spring 123*s*, thereby placing the spool 123*p* in the right-hand position. As a result, the input port 123*b* becomes communicated with the output port 123*d*, such that circulating oil that flows in from the input port 123*b* flows out to the oil passage g3 from the output port 123*d*.

Incidentally, if the hydraulic pressure that flows out to the oil passage g3 from the output port 123*d* becomes large, the circulation pressure PCIR of the starting apparatus 5 will decrease, which may reduce the power transmitting performance of the fluid coupling 4. Therefore, the hydraulic pressure that flows out from the output port 123*d* is input to the oil chamber 123*e* via the oil passages g3 and g4, and when this hydraulic pressure becomes large, the spool 123*p* is switched to the left-hand position in conjunction with the urging force of the spring 123*s*. Accordingly, when the hydraulic pressure that flows out to the oil passage g3 from the output port 123*d* increases to equal to or greater than a set pressure that has been set beforehand, the outflow path of the circulating oil of the starting apparatus 5 switches to the oil passage g2 (i.e., the small flow rate oil passage), which makes it possible to prevent the circulation pressure PCIR in the starting apparatus 5 from decreasing.

Next, circulating oil discharge path switching control in the hydraulic control apparatus 1*b* structured as described above will be described with reference to the flowchart in FIG. 6, in addition to FIG. 5.

Figure 6:
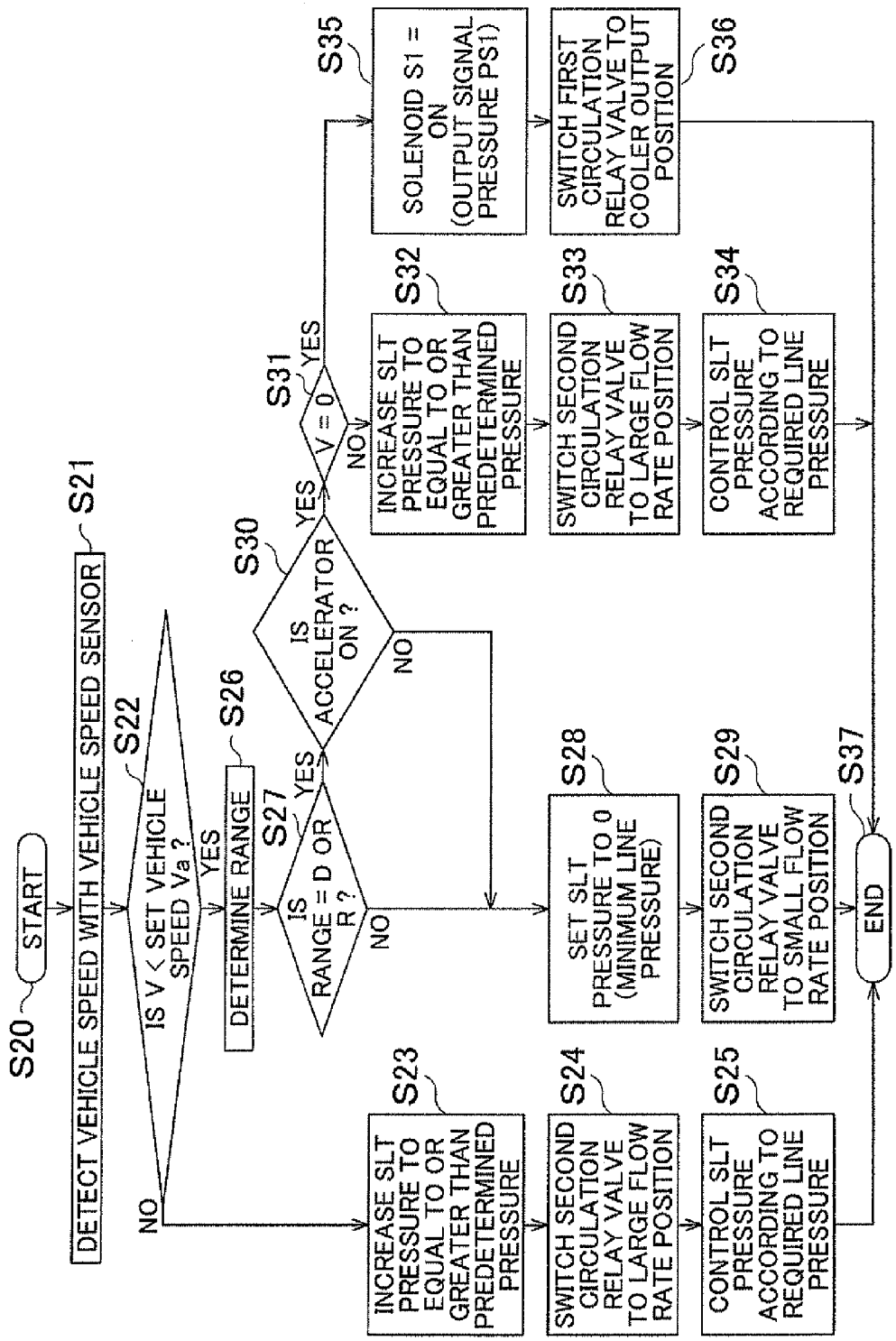
FIG. 6 is a flowchart illustrating hydraulic control of the automatic transmission according to the second example embodiment of the present invention.

As shown in FIG. 6, the circulating oil discharge path switching control according to this example embodiment of the present invention starts (S20) in the control portion (ECU) 200 when the ignition switch is turned on, for example. First, the vehicle speed is detected by an output shaft rotation speed sensor (i.e., a vehicle speed sensor), not shown, (S21). If the vehicle speed V is less than a set vehicle speed (i.e., a predetermined vehicle speed) Va (when the vehicle is almost stopped) (YES in S22), the shift range that a shift lever, not shown, is in is detected (S26) and it is determined whether the D (Drive)-range or the R (Reverse)-range is selected (S27). If neither the D (Drive)-range nor the R (Reverse)-range is selected (i.e., NO in S27), for example, the process proceeds on to step S28. Also, if it is determined in step S27 that the D-range or the R-range is selected (i.e., YES in S27), then it is determined whether the accelerator is on according to an accelerator operation amount sensor, not shown, (S30). If the accelerator is not on, i.e., if the accelerator is off (i.e., NO in S30), for example, the process similarly proceeds on to step S28.

That is, when a range other than the D-range or the R-range is selected (i.e., if the P (Parking)-range or the N (Neutral)-range is selected), or when the accelerator is off even if the D-range or the R-range is selected, it is highly likely that engagement/release control of the clutches and brakes will be performed frequently due to a so-called garage shift being performed. However, the accelerator is off and the engine speed is low, so the rotation speed of the oil pump 7 that operates in conjunction with the engine 100 is low, and thus the amount of oil discharged from the oil pump 7 is small. Therefore, in this state, the first flow rate instructing portion 201 (see FIG. 1) of the control portion 200 outputs a command so that the control pressure PSLT output from the linear solenoid valve SLT becomes 0 and the line pressure PL becomes minimal (S28).

Incidentally, in this case, the second flow rate instructing portion 202 (see FIG. 1) outputs a command so that the signal pressure PS1 is not output from the solenoid valve S1 (so that the solenoid valve S1 turns off). As a result, the first circulation relay valve 122 as a second flow rate changing device (see FIG. 1) is placed in the left-hand position.

As a result, as shown in FIG. 5, the first circulation relay valve 122 is placed in the left-hand position. Also, the urging force of the spring 123*s* overcomes the minimal line pressure PL input to the oil chamber 123*a*, such that the second circulation relay valve 123 as a first flow rate changing device (see FIG. 1) is also placed in the left-hand position. Accordingly, the circulating oil that has flowed out from the output path 5*c* of the starting apparatus 5 is discharged via the oil passage e, the first circulation relay valve 122, the oil passage g1, the second circulation relay valve 123, and the oil passage g2. That is, the circulating oil that has flowed out from the output path 5*c* of the starting apparatus 5 is discharged via the orifice 62 that has the smallest diameter, so the flow resistance is high and the amount of oil that is discharged is restricted to a small amount, which enables the flow rate of the circulating oil that circulates through the starting apparatus 5 to be small. Therefore, even if the amount of oil discharged from the oil pump 7 is small, a large amount of oil will not flow to the starting apparatus 5*e*. In other words, a sufficient flow rate for hydraulic control of the clutches and brakes of the speed change mechanism 6 is able to be ensured, so the hydraulic pressure necessary for shifting can be obtained in the speed change mechanism 6, making it possible to prevent the shift duration from becoming long.

If, on the other hand, in step S30 the accelerator is depressed (i.e., accelerator on) when the D-range is selected (i.e., YES in S30), and moreover, the vehicle speed V detected by the output shaft rotation speed sensor (i.e., the vehicle speed sensor), not shown, is 0 (i.e., YES in S31), for example, the second flow rate instructing portion 202 of the control portion 200 outputs a command to turn the solenoid valve S1 on and output the signal pressure PS1 (S35). As a result, the signal pressure PS1 of the oil chamber 122*a* exceeds the urging force of the spring 122*s*, such that the first circulation relay valve 122 as the second flow rate changing device (see FIG. 1) switches to the right-hand position (the cooler output position), as shown in FIG. 5, (S36).

In this state, the vehicle speed V is 0, so power is transmitted via the fluid coupling 4 when climbing a hill, for example, and the difference in rotation speed between the engine 100 and the input shaft 6*a* of the speed change mechanism 6 is absorbed, and the heating value is large. Also in this state, the accelerator is depressed so it is unlikely that a garage shift will be performed, i.e., it is unlikely that engagement/release control of the clutches and brakes will be performed. Therefore, the circulating oil that has flowed out from the output path 5c of the starting apparatus 5 is discharged via the oil passage e, the first circulation relay valve 122, the oil passage f1, and the oil cooler 10, i.e., is discharged by the path without the orifices 61, 62, and 63 and thus with the least flow resistance. As a result, the maximum amount of oil is able to be discharged because the flow resistance is low, so the cooling efficiency of the starting apparatus 5 can be increased, and the circulating oil that has circulated through the heated starting apparatus 5 can be immediately sent to the oil cooler 10 and cooled. As a result, it is possible to prevent insufficient cooling of the starting apparatus 5, and thus possible to improve the durability of the starting apparatus 5.

Thereafter, if the vehicle speed V becomes equal to or greater than 0, i.e., if the vehicle has started off and is running (i.e., NO in S31), for example, then the engine 100 is operating sufficiently so the amount of oil discharged from the oil pump 7 is sufficient, and engagement/release control of the clutches and brakes is not performed frequently so the flow rate in the speed change mechanism 6 is small though sufficient. Therefore, the first flow rate instructing portion 201 (see FIG. 1) of the control portion 200 outputs a command to increase the control pressure PSLT of the linear solenoid valve SLT to equal to or greater than a predetermined pressure (S32). That is, the line pressure PL is increased to equal to or greater than a predetermined pressure. Also at this time, the solenoid valve S1 is turned off by the second flow rate instructing portion 202 (see FIG. 1) of the control portion 200 such that the signal pressure PS1 is controlled to a non-output state. As a result, as shown in FIG. 5, the first circulation relay valve 122 is switched to the left-hand position by the urging force of the spring 122s, and the second circulation relay valve 123 remains in the right-hand position because the line pressure PL that is equal to or greater than the predetermined pressure in the oil chamber 123a exceeds the urging force of the spring 123s (S33).

In this state, the engine 100 is operating sufficiently so the amount of oil discharged from the oil pump 7 is sufficient, and the engagement/release control of the clutches and brakes will not performed frequently, as described above, so the circulating oil that has flowed out from the output path 5c of the starting apparatus 5 is discharged via the oil passage e, the first circulation relay valve 122, the oil passage g1, the second circulation relay valve 123, and the oil passage g3. Even if the flow resistance is rather high because the circulating oil is discharged via the large diameter orifice 63, the flow resistance is still lower than it is when the circulating oil is discharged via the oil passage g2 so the amount of oil that is discharged is only moderately restricted. Therefore, the flow rate of the circulating oil can be made normal.

Incidentally, in this starting/running state, the control pressure PSLU may be increased to increase the engagement pressure PCONT so that it is equal to or greater than the engagement pressure of the starting clutch 3, such that the starting clutch 3 engages. Also in this state, the back-pressure PL-LUBE of the line pressure PL is output from the oil passage c to the oil passage f1 and the oil cooler 10 via the first circulation relay valve 122, such that ultimately the lubrication flow rate for the lubricating oil passage 11 is ensured (see FIG. 2).

Then, the control portion 200 calculates the required line pressure PL (to ensure the required torque capacity) so that the clutches and brakes in the speed change mechanism 6 do not slip, based on the throttle opening amount (i.e., the engine output) and the like, for example, while keeping the control pressure PSLT of the linear solenoid valve SLT at or above a predetermined pressure (i.e., in a region where the line pressure PL is equal to or greater than a predetermined pressure). Then the control portion 200 controls the control pressure PSLT of the linear solenoid valve SLT according to that calculated required line pressure PL, i.e., controls the line pressure PL to the required hydraulic pressure (S34).

Thereafter, if the vehicle speed V becomes equal to or greater than the set vehicle speed Va (i.e., NO in S22), for example, it means that the vehicle has started off and is running. In this case, the control portion 200 continues to keep the control pressure PSLT of the linear solenoid valve SLT equal to or greater than the predetermined pressure (S23), and keeps the second circulation relay valve 123 switched to the right-hand position (S24). The control portion 200 then controls the control pressure PSLT of the linear solenoid valve SLT according to the calculated required line pressure PL, and controls the line pressure PL to the required hydraulic pressure (S25).

Accordingly, in this running state as well, the engine 100 is operating sufficiently so the amount of oil discharged from the oil pump 7 is sufficient, and the engagement/release control of the clutches and brakes will not performed frequently, as described above, so the circulating oil that has flowed out from the output path 5c of the starting apparatus 5 is discharged via the oil passage e, the first circulation relay valve 122, the oil passage g1, the second circulation relay valve 123, and the oil passage g3. That is, the flow rate of the circulating oil is maintained normal, while the amount of oil that is discharged is restricted to a medium amount via the large diameter orifice 63.

As described above, with the hydraulic control apparatus 1b for an automatic transmission according to the present invention, second circulation relay valve 123 as the first flow rate changing device, the oil passage g2 having the orifice 62, and the oil passage g3 having the orifice 63 change the flow rate to the starting apparatus 5 according to the amount of oil discharged from the oil pump 7. Therefore, when the amount of oil discharged from the oil pump 7 is small, the flow rate to the starting apparatus 5 can be made small and oil can be preferentially supplied to the speed change mechanism 6. Accordingly, the hydraulic pressure necessary for shifting can be obtained in the speed change mechanism 6 when the amount of oil discharged from the oil pump 7 is small, which makes it possible to prevent the shift duration from becoming long.

Also, the shift duration can be prevented from becoming long without increasing the size of the oil pump 7 or increasing the engine speed. Accordingly, the shift duration can be prevented from becoming long without affecting the fuel efficiency of the vehicle.

Further, the engagement state of the starting clutch 3 is controlled by the difference between the engagement pressure PCONT supplied to the hydraulic servo 3a of the starting clutch 3 and the pressure of the circulating oil. However, the second circulation relay valve 123, the oil passage g2 having the orifice 62 therein, and the oil passage g3 having the orifice 63 therein, which serve as first flow rate changing devices, change the flow rate of the circulating oil in a stepped manner, so control of the starting clutch 3 is easier than it is when the flow rate of the circulating oil is changed in a continuous manner.

Moreover, the circulating oil of the starting apparatus 5 is supplied based on the line pressure PL that has been regulated by the primary regulator valve 20 and the linear solenoid valve SLT. However, the second circulation relay valve 123, the oil passage g2 having the orifice 62 therein, and the oil passage g3 having the orifice 63 therein, which serve as first flow rate changing devices, change the flow rate such that the flow rate of the circulating oil becomes smaller when the amount of oil discharged from the oil pump 7 is small. Therefore, oil that is based on the line pressure PL can be preferentially supplied to the speed change mechanism 6, such that the hydraulic pressure necessary for shifting can be obtained in the speed change mechanism 6 when the amount of oil discharged from the oil pump 7 is small, which makes it possible to prevent the shift duration from becoming long.

Also, the second circulation relay valve 123, the oil passage g2 having the orifice 62 therein, and the oil passage g3 having the orifice 63 therein, which serve as first flow rate changing devices, are arranged in the oil passages e and g1 as circulating oil discharge passages. Therefore, if for example the first flow rate changing devices are arranged in the oil passages d1 and d3 which serve as circulating oil supply passages and the flow rate is reduced, the starting apparatus 5 may not be able to be filled up with circulating oil. However, because the flow rate of the circulating oil that is discharged from the starting apparatus 5 is controlled, the starting apparatus 5 can be reliably filled up with lubricating oil regardless of whether the flow rate is large or small.

Furthermore, the modulator valve 21 that stabilizes the circulation pressure of the circulating oil supplied to the starting apparatus 5 is arranged in the oil passages a5, d1, and d3 as circulating oil supply passages. Therefore, the flow rate of the circulating oil can be changed while stabilizing the pressure within the starting apparatus 5, which makes control of the starting clutch 3 even easier. Also, the second circulation relay valve 123, the oil passage g2 having the orifice 62 therein, and the oil passage g3 having the orifice 63 therein, which serve as first flow rate changing devices, are arranged in the oil passages e and g1 that serve as circulating oil discharge passages. Therefore, because the flow rate of the circulating oil that is discharged from the starting apparatus 5 is controlled, the starting apparatus 5 can be reliably filled up with lubricating oil regardless of whether the flow rate is large or small.

Also, the second circulation relay valve 123 as a first flow rate changing device is switched between the small flow rate position that communicates the oil passages e and g1 with the oil passage g2, and the large flow rate position that communicates the oil passages e and g1 with the oil passage g3, based on the line pressure PL that is controlled by the control pressure PSLT of the linear solenoid valve SLT. Therefore, a new solenoid valve does not need to be provided to switch the second circulation relay valve 123, so the hydraulic control apparatus 1b can be prevented from becoming larger.

Incidentally, it is also conceivable to switch the second circulation relay valve 123 (i.e., a first flow rate changing valve) with the engagement pressure PSLU from the linear solenoid valve SLU, as in the first example embodiment. However, in recent years, the engine speed region within which the starting clutch 3 is able to be engaged while in a slip state has been expanded in order to improve fuel efficiency, so there is a tendency to reduce the set value of the engagement pressure PSLU that starts to engage the starting clutch 3. Therefore, when switching the second circulation relay valve 123 with the engagement pressure PSLU, it is necessary to change the setting of the spring 123s so that the second circulation relay valve 123 will switch with lower pressure than the set value. However, if the urging force of the spring 123s is set weak so that the valve will switch with low pressure, it will take time for the position of the spool 123p to be switched (pushed back) to the left-hand position by the spring 123s. Also, in order to switch the position of the valve with low pressure, the linear solenoid valve SLU must be precisely controlled by that amount, such that the control of the linear solenoid valve SLU becomes complex.

However, using the line pressure PL to switch the second circulation relay valve 123, as in the second example embodiment, enables the second circulation relay valve 123 to be controlled more quickly and easily while increasing the range of the engine speed within which the starting clutch 3 can be engaged in a slip state than when the engagement pressure PSLU is used to switch the second circulation relay valve 123.

Incidentally, in the first and second example embodiments described above, a case is described in which the hydraulic control apparatus 1a and 1b for an automatic transmission is applied to the automatic transmission 2 that establishes six forward speeds and one reverse speed. Of course, the present invention is not limited to this. In particular, the present invention may be applied to any kind of automatic transmission as long as it is an automatic transmission that is provided with a speed change mechanism that performs engagement/release control of clutches and brakes during a garage shift.

Also, in the first and second example embodiments described above, the starting apparatus 5 is described as being formed of the starting clutch 3 and the fluid coupling 4. However, the present invention is not limited to this. For example, the starting apparatus may include only a starting clutch or may include a fluid power transmitting device such as a torque converter. In particular, the present invention may similarly be applied even with a torque converter having a lock-up clutch.

Also, in these example embodiments, the engine speed and vehicle speed correspond to the amount of oil discharged from the oil pump 7. Here, the amount of oil discharged from the oil pump may actually be calculated from the engine speed or the vehicle speed, or the amount of oil discharged from the oil pump may be estimated using a map or the like, for example, based on the state of the vehicle, such as the engine speed and the vehicle speed.

Figure 7:
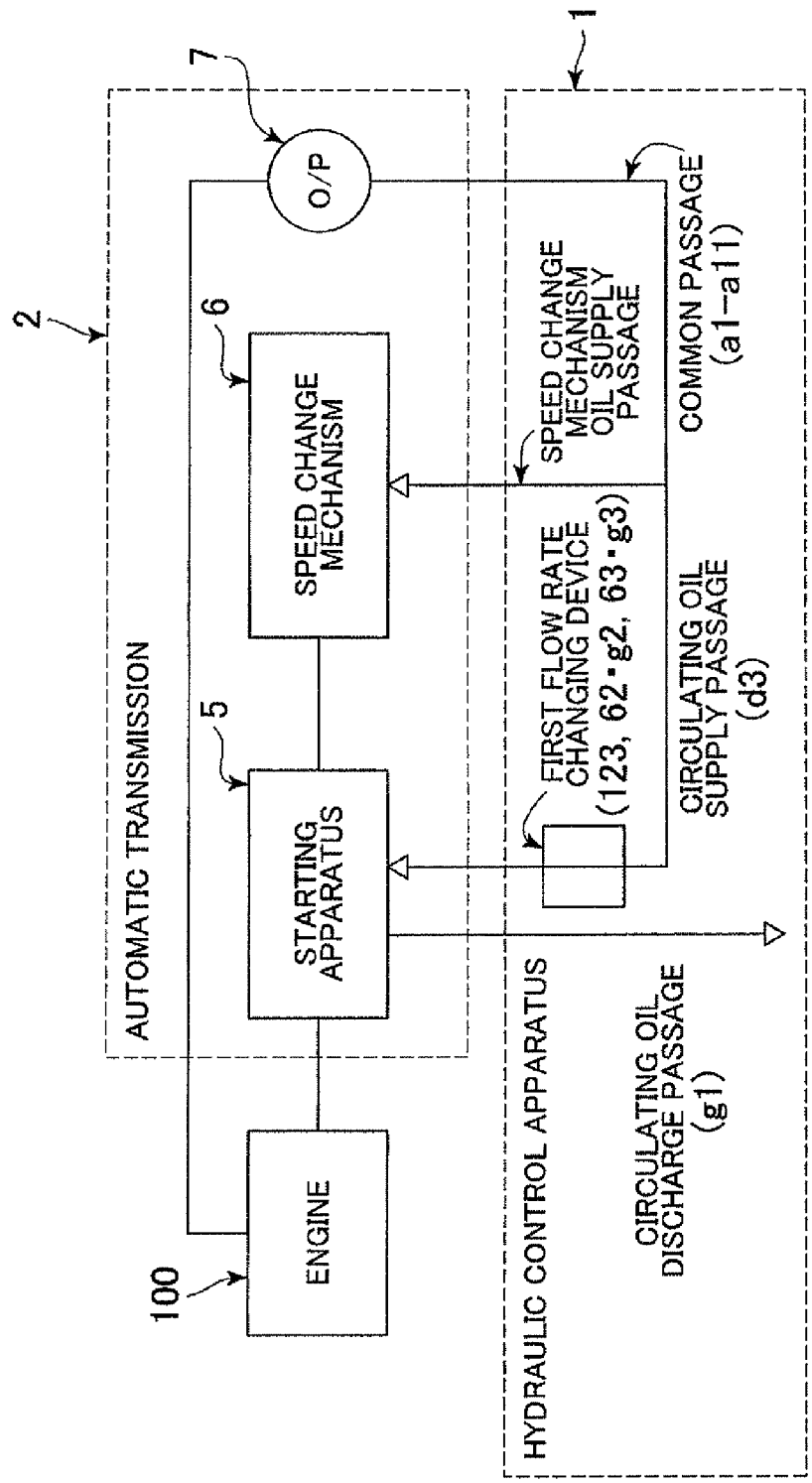
FIG. 7 is a view showing a frame format of an example embodiment in which a first flow rate changing device is provided in a circulating oil supply passage.

Further, in the first and second example embodiments, the first flow rate changing devices are arranged in the circulating oil discharge passage. However, as shown in FIG. 7, the present invention may also be structured with the first flow rate changing devices arranged in the circulating oil supply passage (d3). In this case, in order to form the specific example embodiment shown in FIG. 7 by changing the structure shown in FIG. 5, for example, it is possible to arrange the second circulation relay valve 123 (i.e., a first flow rate changing device) midway in the oil passage d3 (i.e., a circulating oil supply passage), connect the input port 123b to the upstream side of the oil passage d3 (i.e., the circulating oil supply passage), arrange the oil passage g2 (i.e., the small flow rate oil passage) having the orifice 62 therein and the oil passage g3 (i.e., the large flow rate oil passage) having the orifice 63 therein so that they are connected to the downstream side of the oil passage d3 (i.e., the circulating oil supply passage), and form the oil passage g1 (i.e., the circulating oil discharge passage) so that it opens to the drain port EX.

Also, in the first example embodiment, the amount of oil discharged from the oil pump 7 is determined by the engine speed (step S6 in FIG. 4), and in the second example embodiment, the amount of oil discharged from the oil pump 7 is determined by whether the accelerator is on or off (step S30 in FIG. 6). However, in this case, the oil pump operates in conjunction with the engine. In a case in which the oil pump does not operate in conjunction with the engine, for example, it is possible to detect the amount of oil discharged from the oil pump by directly detecting the rotation speed of the oil pump. Furthermore, it is also possible to detect the amount of oil discharged from the oil pump from the vertical shift in the fluid level in the oil pan, for example. That is, as long as the amount of oil discharged from the oil pump can be detected, any detection method may be used.

The hydraulic control apparatus for an automatic transmission according to the present invention may be used in an automatic transmission provided in a passenger vehicle. In particular, the hydraulic control apparatus for an automatic transmission according to the present invention is preferably used in an automatic transmission that circulates circulating oil to a fluid power transmitting device and also supplies hydraulic pressure to a speed change mechanism, and in which the amount of oil discharged from an oil pump is low during a garage shift.

The invention claimed is:

1. A hydraulic control apparatus for an automatic transmission that supplies oil discharged from an oil pump that operates in conjunction with a drive source to both a starting apparatus that is connected to the drive source and an automatic speed change mechanism that is connected to the starting apparatus, comprising:
a circulating oil supply passage that is configured to always supply oil that has been discharged from the oil pump into a common oil passage to the starting apparatus as circulating oil;
a circulating oil discharge passage that is configured to always discharge the circulating oil from the starting apparatus;
a speed change mechanism oil supply passage that supplies oil in the common oil passage to the automatic speed change mechanism;
a first flow rate changing device configured with a small flow rate oil passage having therein a flow rate restricting member that restricts a slow flow rate through the small flow rate oil passage, and a large flow rate oil passage that enables a large flow rate through the large flow rate oil passage, the large flow rate being larger than the slow flow rate, the first flow rate changing device being arranged in the circulating oil discharge passage and configured to change a flow rate of the circulating oil in predetermined stepped increments; and
a first flow rate instructing portion that outputs a command to the first flow rate changing device to change the flow rate of the circulating oil according to an amount of oil discharged from the oil pump;
a drive shaft that is connected to the drive source;
an input shaft that is connected to the automatic speed change mechanism;
a clutch that is configured to connect the drive shaft to the input shaft, an engagement state of the clutch being controlled by a difference between an engagement pressure supplied to a hydraulic servo of the clutch and a pressure of the circulating oil;
a line pressure regulating portion that regulates a pressure of the oil discharged from the oil pump as line pressure,
wherein the circulating oil of the starting apparatus is supplied based on the line pressure regulated by the line pressure regulating portion; and the first flow rate instructing portion outputs the command to the first flow rate changing device to change the flow rate such that the flow rate of the circulating oil decreases when the amount of oil discharged from the oil pump is small.

2. The hydraulic control apparatus according to claim 1, wherein the first flow rate instructing portion outputs the command to change the flow rate of the circulating oil based on an actual amount of oil discharged from the oil pump that has been calculated from a speed of the engine.

3. The hydraulic control apparatus according to claim 1, wherein the first flow rate instructing portion estimates an amount of oil discharged from the oil pump based on a state of a vehicle in which the hydraulic control apparatus is installed, and outputs the command to change the flow rate of the circulating oil based on that estimated amount of oil discharged.

4. The hydraulic control apparatus according to claim 1, wherein the line pressure regulating portion includes a regulator valve that regulates the pressure of the oil discharged from the oil pump, and a first pressure regulating solenoid valve that outputs control pressure that controls the regulator valve;
the first flow rate changing device includes a first flow rate changing valve that receives the line pressure and switches between a small flow rate position that communicates the circulating oil discharge passage with the small flow rate oil passage, and a large flow rate position that communicates the circulating oil discharge passage with the large flow rate oil passage, based on the line pressure; and
the first flow rate instructing portion outputs a command to the first pressure regulating solenoid valve to change the line pressure according to the amount of oil discharged from the oil pump.

5. The hydraulic control apparatus according to claim 1, wherein the first flow rate changing device is arranged in the circulating oil discharge passage.

6. The hydraulic control apparatus according to claim 1, further comprising:
a circulating oil stabilizing device that is arranged in the circulating oil supply passage and stabilizes a circulation pressure of the circulating oil supplied to the starting apparatus,
wherein the first flow rate changing device is arranged in the circulating oil discharge passage.

7. The hydraulic control apparatus according to claim 1, further comprising:
a second pressure regulating solenoid valve that regulates engagement pressure supplied to a hydraulic servo of the clutch,
wherein the first flow rate changing device includes a first flow rate changing valve that receives engagement pressure of the second pressure regulating solenoid valve and switches between a small flow rate position that communicates the circulating oil discharge passage with the small flow rate oil passage, and a large flow rate position that communicates the circulating oil discharge passage with the large flow rate oil passage, based on the engagement pressure; and
the first flow rate instructing portion outputs a command to the second pressure regulating solenoid valve to change the engagement pressure according to the amount of oil discharged from the oil pump.

8. The hydraulic control apparatus according to claim 7, wherein the first flow rate changing valve switches from the small flow rate position to the large flow rate position when the engagement pressure becomes equal to a set pressure that is lower than an engagement starting pressure that engages the clutch.

9. The hydraulic control apparatus according to claim 8, further comprising:
a cooler oil passage in which an oil cooler is provided;
a second flow rate changing device that is interposed between the starting apparatus and the first flow rate changing device in the circulating oil discharge passage, and that is switched between a cooler communicating state that communicates the starting apparatus with the cooler oil passages, and a cooler non-communicating state that communicates the starting apparatus with the first flow rate changing device; and a second flow rate instruction portion that outputs a command to the second flow rate changing device so that the second flow rate changing device is switched between the cooler communicating state and the cooler non-communicating state based on a heating value of the starting apparatus.

10. The hydraulic control apparatus according to claim 9, further comprising a signal solenoid valve that outputs a signal pressure based on the command from the second flow rate instruction portion, wherein the second flow rate changing device is a second flow rate changing valve that is switched between the cooler communicating state and the cooler non-communicating state based on the signal pressure.

11. The hydraulic control apparatus according to claim 10, wherein the signal solenoid valve is the solenoid valve that outputs a signal pressure in an event of an all off failure; and the hydraulic control apparatus further comprises a failsafe valve that is switched based on the signal pressure in the event of the all off failure, and the failsafe valve outputs an engagement pressure to a hydraulic servo of a friction engagement elements for shifting of the automatic speed change mechanism, wherein the first flow rate changing valve is interposed between the signal solenoid valve and the failsafe valve, and the first flow rate changing valve blocks the signal pressure to the failsafe valve when the first flow rate changing valve switches to the large flow rate position based on the engagement pressure of the second pressure regulating solenoid valve.

* * * * *